(12) United States Patent
Greiner

(10) Patent No.: US 7,779,391 B2
(45) Date of Patent: Aug. 17, 2010

(54) METHOD OF EMPLOYING INSTRUCTIONS TO CONVERT UTF CHARACTERS WITH AN ENHANCED EXTENDED TRANSLATION FACILITY

(75) Inventor: Dan F. Greiner, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 982 days.

(21) Appl. No.: 11/469,916

(22) Filed: Sep. 5, 2006

(65) Prior Publication Data

US 2008/0127122 A1    May 29, 2008

(51) Int. Cl.
G06F 9/44    (2006.01)
G06F 17/00    (2006.01)

(52) U.S. Cl. .................. 717/126; 717/124; 717/120; 717/154; 717/141; 715/234; 715/236; 715/237; 715/239

(58) Field of Classification Search ................ 717/126
See application file for complete search history.

(56) References Cited

U.S. PATENT DOCUMENTS 7,308,458 B2 * 12/2007 Vincent, III ................ 707/102
7,596,745 B2 * 9/2009 Dignum et al. ............. 715/234
7,665,015 B2 * 2/2010 Dignum et al. ............. 715/234
2004/0015832 A1 * 1/2004 Stapp et al. ................ 717/106

OTHER PUBLICATIONS

IBM "z/Architecture Principles of Operation" third edition, Jun. 2003.*

* cited by examiner

*Primary Examiner*—Thomas K Pham
(74) *Attorney, Agent, or Firm*—Cantor Colburn LLP; John Campbell

(57) ABSTRACT

A method, article, and system for providing an effective implementation of assembler language instructions to convert Unicode and Unicode-tranformation-format (UTF) characters implemented on 21, 31, and 64-bit architectures, while maintaining backward compatibility with existing systems. The enhanced Extended-Translation Facility 3 (ETF3) instruction set introduces a new operand in an unused field ($M_3$) that facilitates a change in the original instruction format and its intended function. With the ETF3-Enhancement Facility installed, a value of zeros in the $M_3$ field indicates that instruction operation is to continue as originally defined. When a nonzero value is coded in the $M_3$ field a new function is carried out. The assembler accommodates the changes by making the new $M_3$ field optional when coding the instructions. If the $M_3$ field is not coded, the assembler defaults to providing zeros in the $M_3$ field (as found in the original instruction format), and backward compatible operation is provided.

16 Claims, 11 Drawing Sheets

METHOD OF EMPLOYING INSTRUCTIONS TO CONVERT UTF CHARACTERS WITH AN ENHANCED EXTENDED TRANSLATION FACILITY

TRADEMARKS

IBM® is a registered trademark of International Business Machines Corporation, Armonk, N.Y., U.S.A. Unicode® is a registered trademark of Unicode Inc., Mountain View, Calif., U.S.A. Other names used herein may be registered trademarks, trademarks or product names of International Business Machines Corporation or other companies.

BACKGROUND OF THE INVENTION

1. Field of the Invention

This invention relates generally to instruction implementation and register utilization within a computer processor, and more particularly to providing a method, article, and system for the effective implementation of an instruction set that performs operations on Unicode and Unicode-transformation-format (UTF) characters, and can be implemented on 24, 31, and 64-bit architectures, while maintaining backward compatibility with existing systems.

2. Description of the Related Art

Software has become a major portion of the cost associated with computer systems because it is very "labor-intensive." Some of this cost is due to the effort involved in writing and debugging programs; other costs involve maintaining programs after they have been written. Accordingly, considerable effort has been expended in order to reduce the time and costs involved with writing, debugging and maintaining moderate and large software programs. Much of this effort has been related to developing programming languages and programming techniques, which will allow programmers to build on or "reuse" programs and code segments that have been written by others.

Until very recently, software programming was heavily dominated by an approach referred to as "structured programming." Common software programming languages used in this approach were, and remain, BASIC, FORTRAN, COBOL, PL/1, and C. These are considered "higher order" languages that are written in human readable code and ultimately translated into machine or computer readable code by a compiler. Typically, structured programs have consisted of a combination of defined variables of specific data types, e.g. integer, real, and character, and a complimentary set of functions or routines, which operate on these variables. Often, a program would include sub-routines which are smaller routines within a program or larger routines that carry out certain operations, e.g. printing data in a given output format. The emphasis to this approach was inputs—functions—outputs and they were often represented as flowcharts by the designers, which logically represented how the program functioned and branched into different functional paths. As an increasing number of programs became large (tens of thousands of lines of code and above) structured programs became increasingly complex and difficult to write, troubleshoot and maintain.

In response to the unwieldy nature of structured programs and their related flowcharts, new approaches to software engineering called Object-Oriented Design (OOD) and Object-Oriented Programming (OOP) have emerged and gained increasing popularity among software developers. OOP promised greater reuse and maintainability than its structured programming predecessor because of an emphasis on well-defined and self-contained objects, rather than the structured programming emphasis on a proliferation of relatively loosely related data manipulating functions and subroutines.

Object Oriented Programming techniques involve the definition, creation, use and destruction of "objects." These objects are software entities comprising data elements, or attributes, and methods, or functions, which manipulate the data elements. The attributes and related methods are treated by the software as an entity and can be created, used and destroyed as if they were a single item. Together, the attributes and methods enable objects to model virtually any real-world entity in terms of the entity's characteristics, represented by the data elements, and the entity's behavior, represented by data manipulation functions or methods. In this way, objects can model concrete things like people and computers, and they can also model abstract concepts like numbers or geometrical designs. Object-Oriented Programming languages include C++, Java, as well as other languages.

As was previously mentioned the "higher order" programming languages (structured, object oriented) must ultimately be translated into machine or computer readable code by a compiler to carry out instructions to be executed by a computing device and/or processor.

Instruction sets used in computer systems employing so-called Complex Instruction Set Computing (CISC) architecture include both simple instructions (e.g. LOAD, or ADD) and complex instructions (e.g. PROGRAM CALL, or LOAD ADDRESS SPACE PARAMETERS). Typical complex instruction-set computers have instructions that combine one or two basic operations (such as "add", "multiply", or "call subroutine") with implicit instructions for accessing memory, incrementing registers upon use, or dereferencing locations stored in memory or registers. As an example to which the invention has particular relevance, see "The z/Architecture Principles of Operation" (Publication Number SA22-7831-04, available from IBM Corporation, Armonk, N.Y.), which is incorporated herein by reference in its entirety. As these computer systems (e.g. IBM System 390, IBM System z9) have become more powerful, larger percentages of the instruction set have been implemented using hardware execution units to increase system performance. Conventionally, the complex functions are implemented in microcode because building hardware execution units to execute them is expensive and error prone. A microcode/microprogram implements a central processing unit (CPU) instruction set. Just as a single high level language statement is compiled to a series of machine instructions (load, store, shift, etc), each machine instruction is in turn implemented by a series of microinstructions, sometimes called a microprogram.

The Extended-Translation Facility 3 (ETF3) is an instruction set introduced on the 113M series of z/990 processors. The z/990 processors (T-Rex GA3) are designed for use in high performance computer servers for data and transaction serving. The z/990 processors and associated computer servers are designed to support both 32 and 64 bit computations, as well as both structured and object oriented programming languages. The ETF3 performs operations on Unicode and Unicode-transformation-format (UTF) characters. The facility consists of six instructions, which are documented in "z/Architecture Principles of Operation" (Publication Number SA22-7832-04, available from IBM Corporation, Armonk, N.Y.), which as previously stated is incorporated herein by reference in its entirety.

However certain ETF3 instructions, and in particular, the CONVERT UTF-16 TO UTF-32 (CU24), CONVERT UTF-16 TO UTF-8 (CU21), CONVERT UTF-8 TO UTF-16 (CU12), and CONVERT UTF-8 TO UTF-32 (CU14) were designed using the Unicode 2.0 Standard. For performance reasons, the implementation of these instructions allows irregular code values to be transformed without detecting an illegal character. This behavior was allowed in the Unicode 3.0 Standard (incorporated herein by reference in its entirety), as stated in definition 32 (D32) on page 46: "For a given UTF, an ill-formed code value sequence that is not illegal is called an irregular code value sequence. To make implementations simpler and faster, some transformation formats may allow irregular code value sequences without requiring error handling. For example, UTF-8 allows nonshortest code value sequences to be interpreted: a UTF-conformant process may map the code value sequence C0 80 ($11000000_2$ $10000000_2$) to the Unicode value U+0000, even though a Unicode-conformant process shall never generate that code value sequence it shall generate 00 ($00000000_2$) instead. A conformant process shall not use irregular code value sequences to encode out-of-band information."

The Unicode 4.0 standard (incorporated herein by reference in its entirety) substantially restricts the allowable code value sequences. Definition 32 (cited above) is superseded, and the irregular code sequences described therein are now disallowed by definition 36 (D36) as shown in pages 77-78 of the 4.0 standard. It has been observed that the CONVERT UTF-8 TO UNICODE (CUTFU) instruction fails to set condition code 2 for invalid characters as defined in the 4.0 standard. This problem requires changes to be made to the architecture.

The present invention is directed to addressing, or at least reducing the effects of, one or more of the problems set forth above, through the introduction of an enhanced version of ETF3.

SUMMARY OF THE INVENTION

Embodiments of the present invention include an instruction set comprising instructions designed to convert the UTF argument characters of a second operand within a data processing system, with a higher level assembler, comprising: an operation code field, which identifies the instruction; a control field, which controls the operation of the instruction; and one or more general registers; where a first general register contains the address of a first operand, and a second general register contains the address of a second operand. The previously mentioned control field comprises a well-formedness-checking control that determines whether well-formedness checking and processing is performed by the instruction.

When the well-formedness-checking control is zero, well-formedness checking and processing is not performed by the instruction. However, when the well-formedness-checking control is one, well-formedness checking and processing is performed by the instruction. In addition, the control field is defined to be an optional operand to the high-level assembler, where the default value for the control field is zero if it is not specified, and therefore ensuring backward compatibility of the instruction set with previous systems. The instruction set of the present invention is compatible with 24-bit, 31-bit, and 64-bit architectures.

Embodiments of the present invention also include a method to convert the UTF argument characters of a second operand within a data processing system, where translation proceeds until a predetermined number of characters have been processed or until predetermined conditions have been met.

A system for implementing the method of the present invention, as well as, an article comprising one or more machine-readable storage media containing instructions that when executed enable a processor to carry out the method, are also provided.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

The ETF3-enhancement facility extends the operation of the CU24, CU21, CU12, and CU14 instructions, as follows. Previously unused bits of the instruction image are used to add a new $M_3$ operand to the cited instructions (note, this changes the instruction format from RRE to RRF). An enhanced-well-formedness-checking bit (W bit) in the $M_3$ field controls whether additional well-formedness checking is performed by the instruction. When the W bit is zero (or not specified), enhanced well-formedness checking is not performed, and the instructions operate as though the ETF3-enhancement facility were not installed (note this ensures compatibility with old programs which do not specify the new $M_3$ operand). When the W bit is one, additional well-formedness checking is performed. The $M_3$ field is defined to be an optional operand for the cited instructions as defined to the High-Level Assembler. The default for the operand if it is not specified is zero, thus ensuring compatibility with the previous operation of the instructions.

Table 1 shows the format of the $M_3$ field when the ETF3-enhancement facility is installed.

TABLE 1

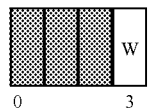

The bits of the $M_3$ field are defined as follows:

Unassigned: Bits 0-2 are unassigned and should contain zeros to ensure future program operational compatibility.

Enhanced-well-formedness-checking bit (W): The W bit, bit 3 of the $M_3$ field, controls whether additional well-formedness checking is performed by the instruction. When the W bit is set to zero (or not specified), enhanced well-formedness checking is not performed. When the W bit is one, enhanced well-formedness checking is performed.

Note: When the ETF3-enhancement facility is not installed, the $M_3$ field is ignored.

Figure 2:
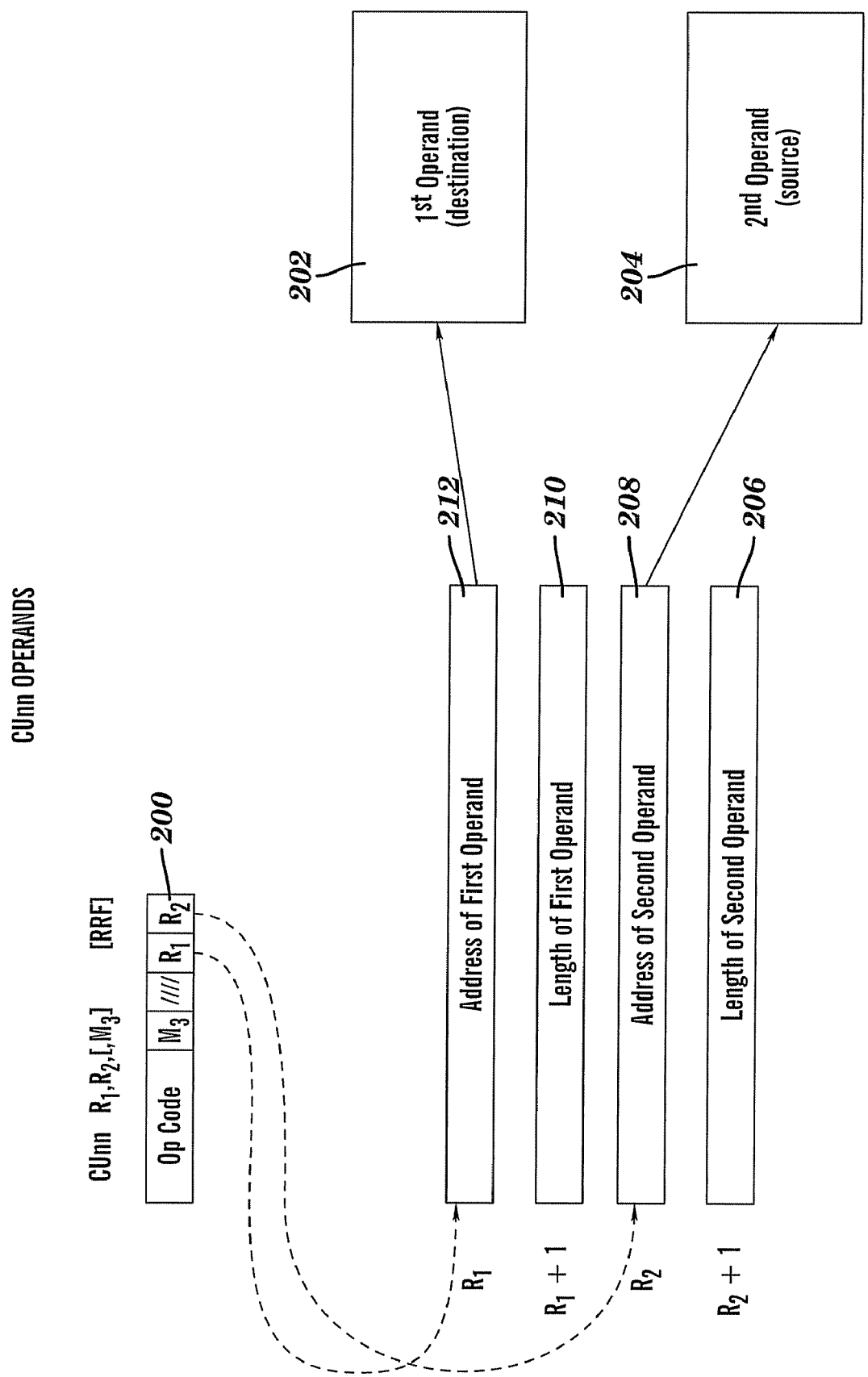
FIG. 2 is a block diagram depicting the operation of the CONVERT n TO n instructions according to an embodiment of the present invention.

The Unicode conversion instructions all have assembler mnemonic "CUnn" where the characters nn represent the size in bytes of the destination and source operands, respectively. Of particular interest to the ETF3-enhancement facility are the CU12, CU14, CU21, and CU24, instructions. Referring to FIG. 2, the instruction 200 is comprised of the following:

An operation code (Op Code) field,

The $R_1$ field containing the number of an even-numbered general register designating the first (destination) operand's address and length, The $R_2$ field containing the number of an even-numbered general register designating the second (source) operand's address and length, and An optional mask field ($M_3$) containing the enhanced-well-formedness-checking control. When the ETF3-enhancement facility is not installed, the $M_3$ field is ignored.

The even-numbered register (212) of the register pair designated by the $R_1$ field contains the address of the destination operand in storage (202), and the odd-numbered register (210) of this pair contains the length of the destination operand. The even-numbered register (208) of the register pair designated by the $R_2$ field contains the address of the source operand in storage (204), and the odd-numbered register (206) of this pair contains the length of the source operand.

Table 2. summarizes the CONVERT UTF-16 TO UTF-32 instruction under the EFT3-enhancement facility.

TABLE 2

CONVERT UTF-16 TO UTF 32

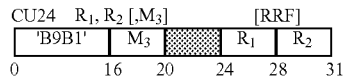

The operation of the CONVERT UTF-16 TO UTF-32 is as follows. The two-byte UTF-16 (Unicode) characters of the second operand are converted to UTF-32 characters and placed at the first-operand location. The UTF-32 characters are four bytes. The operation proceeds until the end of the first or second operand is reached or a CPU-determined number of characters have been converted, whichever occurs first. The result is indicated in the condition code. The $R_1$ and $R_2$ fields each designate an even-odd pair of general registers and must designate an even-numbered register; otherwise, a specification exception is recognized. The location of the leftmost byte of the first operand and the second operand is designated by the contents of general registers $R_1$ and $R_2$, respectively. In the 24-bit or 31-bit addressing mode, the number of bytes in the first-operand and second-operand locations is specified by the contents of bit positions 32-63 of general registers $R_1+1$ and $R_2+1$, respectively, and those contents are treated as 32-bit unsigned binary integers. In the 64-bit addressing mode, the number of bytes in the first-operand and second-operand locations is specified by the entire contents of general registers $R_1+1$ and $R_2+1$, respectively, and those contents are treated as 64-bit unsigned binary integers.

Figure 1A:
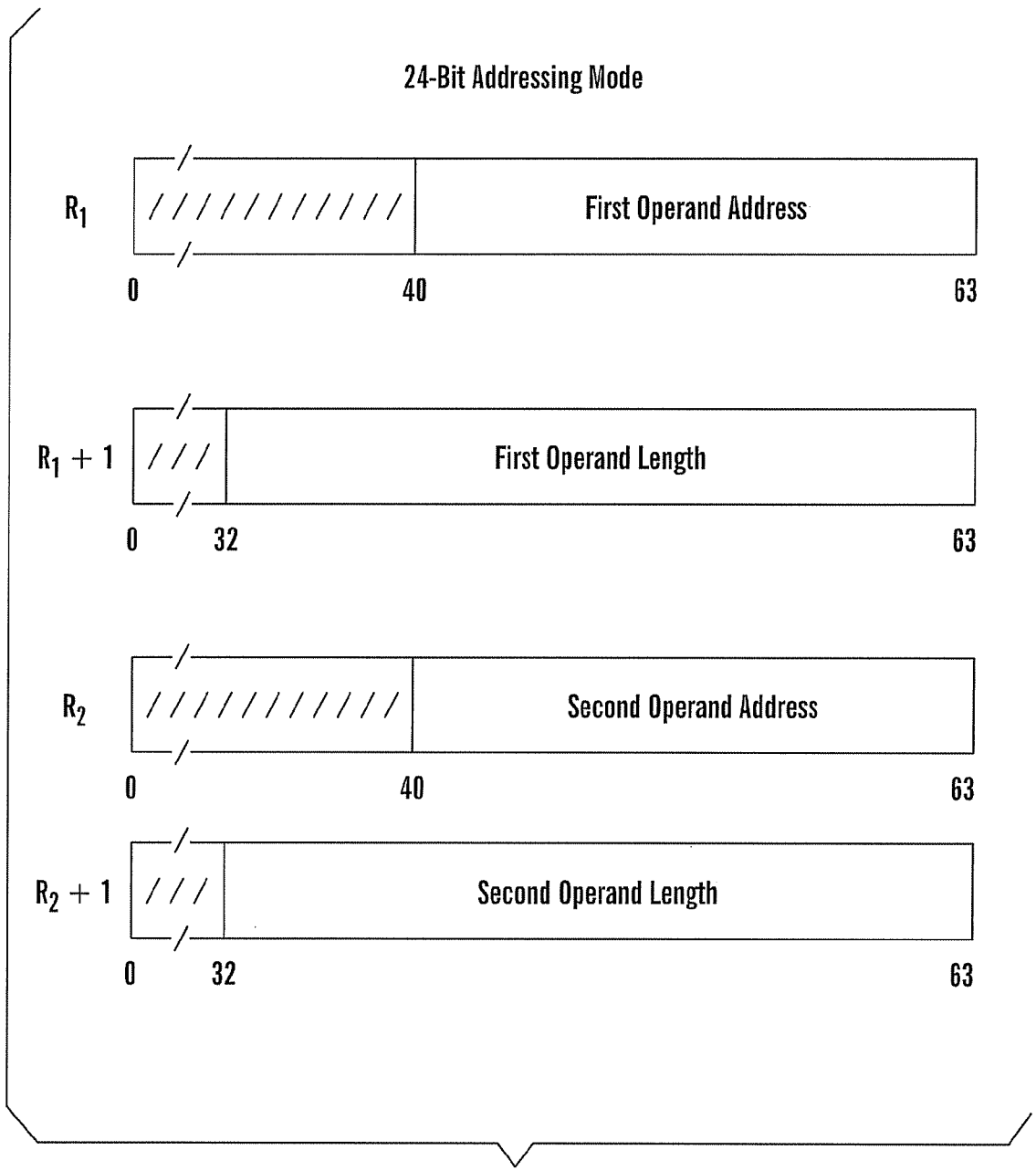
FIG. 1A is a block diagram illustrating the handling of addresses in general registers $R_1$ and $R_2$ in the 24-bit addressing mode according to an embodiment of the present invention.
Figure 1B:
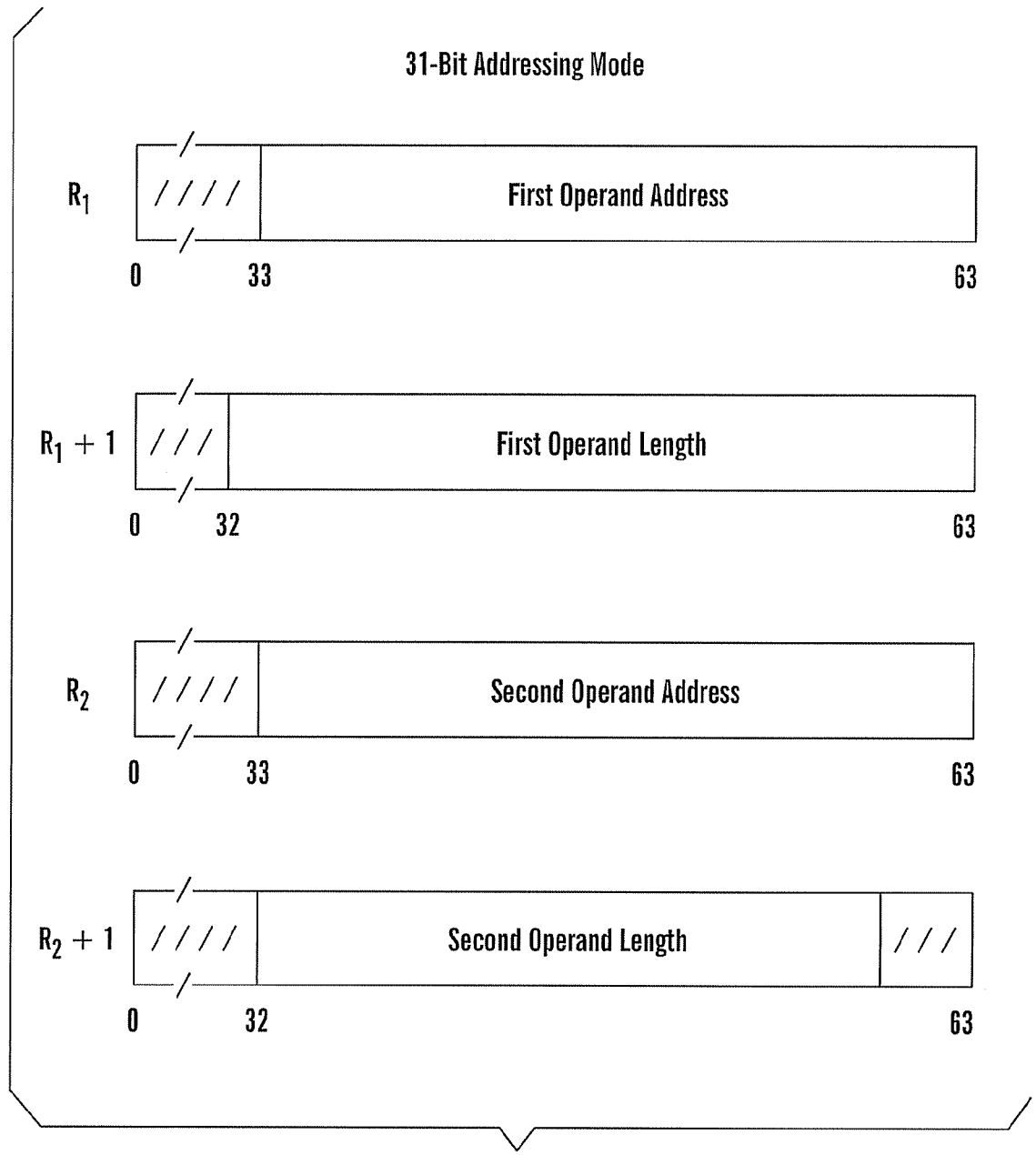
FIG. 1B is a block diagram illustrating the handling of addresses in general registers $R_1$ and $R_2$ in the 31-bit addressing mode according to an embodiment of the present invention.
Figure 1C:
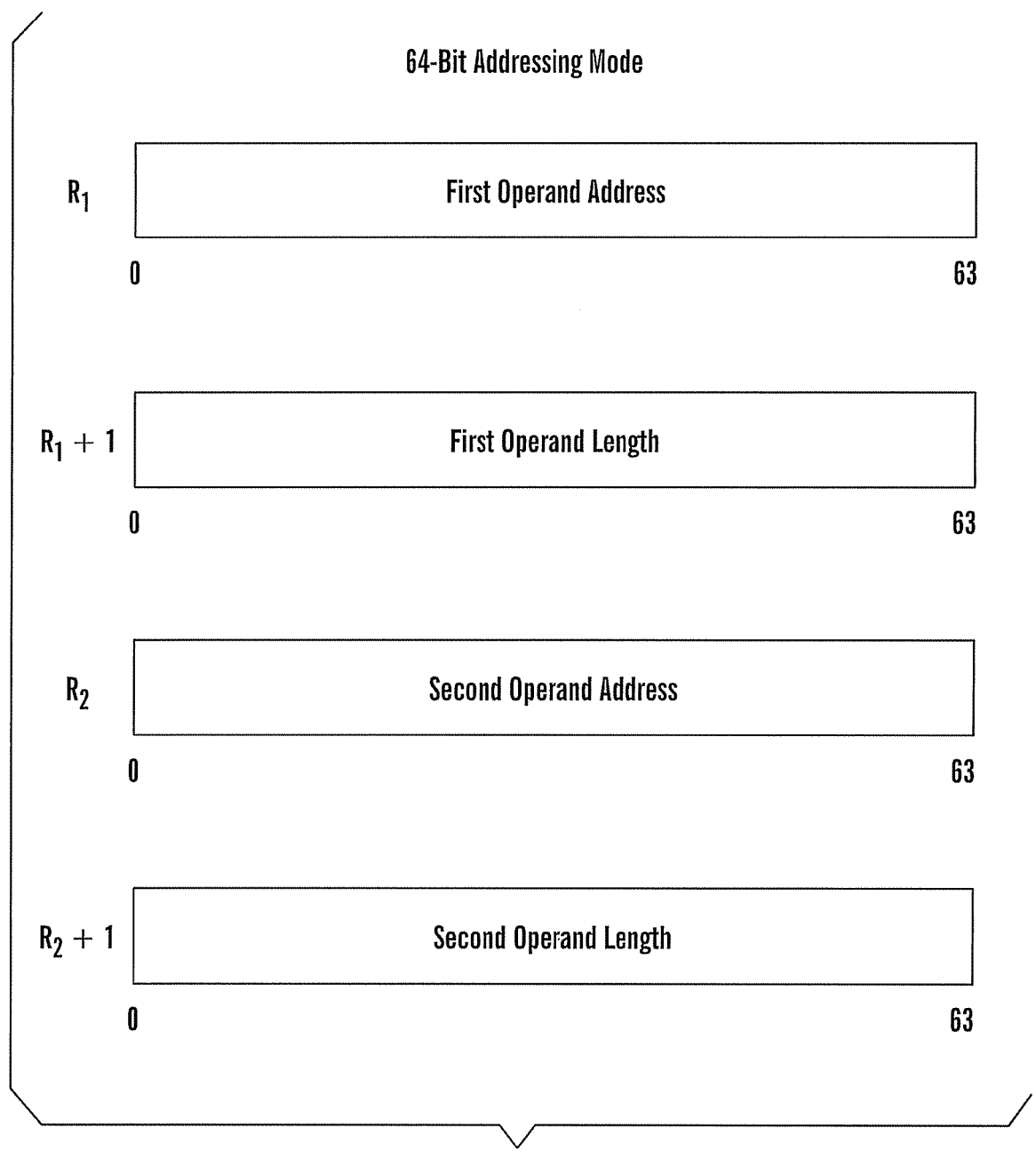
FIG. 1C is a block diagram illustrating the handling of addresses in general registers $R_1$ and $R_2$ in the 64-bit addressing mode according to an embodiment of the present invention.

FIGS. 1A-1C illustrate the handling of the addresses in general registers $R_1$ and $R_2$, which is dependent on the addressing mode. In the 24-bit addressing mode (FIG. 1A), the contents of bit positions 40-63 of general registers $R_1$ and $R_2$ constitute the address, and the contents of bit positions 0-39 are ignored. In the 31-bit addressing mode (FIG. 1B), the contents of bit positions 33-63 of the registers constitute the address, and the contents of bit positions 0-32 are ignored. In the 64-bit addressing mode (FIG. 1C), the contents of bit positions 0-63 constitute the address.

The characters of the second operand are selected one by one for conversion, proceeding left to right. The characters resulting from a conversion are placed at the first-operand location, proceeding left to right. The operation proceeds until the first-operand or second-operand location is exhausted, a CPU-determined number of second-operand characters have been converted, or when the ETF3-enhancement facility is installed and the W bit is one, until an invalid UTF low surrogate is encountered in the second operand.

To show the method of converting a UTF-16 character to a UTF-32 character, the bits of a Unicode character are identified by letters as follows:

| Unicode Character | | 111111 |
|---|---|---|
| Bit Numbers | 01234567 | 89012345 |
| Identifying Bit Letters | abcdefgh | ijklmnop |

In the case of a Unicode surrogate pair, which is a character pair consisting of a character called a high surrogate followed by a character called a low surrogate, the bits are identified by letters as follows:

| Unicode High Surrogate | | 111111 |
|---|---|---|
| Bit Numbers | 01234567 | 89012345 |
| Identifying Bit Letters | 110110ab | cdefghij |
| Unicode Low Surrogate | 11112222 | 22222233 |
| Bit Numbers | 67890123 | 45678901 |
| Identifying Bit Letters | 110111kl | mnopqrst |

Any Unicode character in the range 0000 to D7FF and DC00 to FFFF hex is converted to a four-byte UTF-32 character as follows:

| Unicode Character | abcdefgh | ijklmnop | | |
|---|---|---|---|---|
| UTF-32 Character | 00000000 | 00000000 | abcdefgh | ijklmnop |

Any Unicode surrogate pair starting with a high surrogate in the range D800 to DBFF hex is converted to a four-byte UTF-32 character as follows:

| Unicode Characters | 110110ab | cdefghij | 110111kl | mnopqrst |
|---|---|---|---|---|
| UTF-32 Character | 00000000 | 000uvwxy | efghijkl | mnopqrst | where uvwxy = abcd + 1

When the ETF3-enhancement facility is not installed, or when the W bit of the $M_3$ field is zero, the first six bits of the Unicode low surrogate are ignored. When the ETF3-enhancement facility is installed, and the W bit is one, the first six bits Unicode low surrogate must contain 110111 binary; otherwise, the Unicode low surrogate is invalid, and condition code 2 is set.

The second-operand location is considered exhausted when it does not contain at least two remaining bytes or at least four remaining bytes when the first two bytes are a Unicode high surrogate. The first-operand location is considered exhausted when it does not contain at least four remaining bytes. When the second-operand location is exhausted, condition code 0 is set. When the first-operand location is exhausted, condition code 1 is set, except that condition code 0 is set if the second-operand location also is exhausted. When a CPU-determined number of characters have been converted, condition code 3 is set. When the conditions for setting condition codes 1 and 2 are both met, condition code 2 is set (which is part of the solution for the present invention).

When the operation is completed, the contents of general register $R_2+1$ are decremented by the number of bytes converted, and the contents of general register $R_2$ are incremented by the same number. Also, the contents of general register $R_1+1$ are decremented by the number of bytes placed at the first-operand location, and the contents of general register $R_1$ are incremented by the same number. When general registers $R_1$ and $R_2$ are updated in the 24-bit or 31-bit addressing mode, bits 32-39 of them, in the 24-bit mode, or bit 32, in the 31-bit mode, may be set to zeros or may remain unchanged. In the 24-bit or 31-bit addressing mode, the contents of bit positions 0-31 of general registers $R_1$, $R_1+1$, $R_2$, and $R_2+1$, always remain unchanged.

With the implementation of the ETF3-Enhancement Facility of the present invention, when condition code 2 is set, general register $R_2$ contains the address of the invalid Unicode high surrogate.

When condition code 3 is set, the registers have been updated so that the instruction, when re-executed, resumes at the next byte locations to be processed. The CPU on the basis of improving system performance determines the amount of processing that results in the setting of condition code 3, and it may be a different amount each time the instruction is executed.

Figure 3:
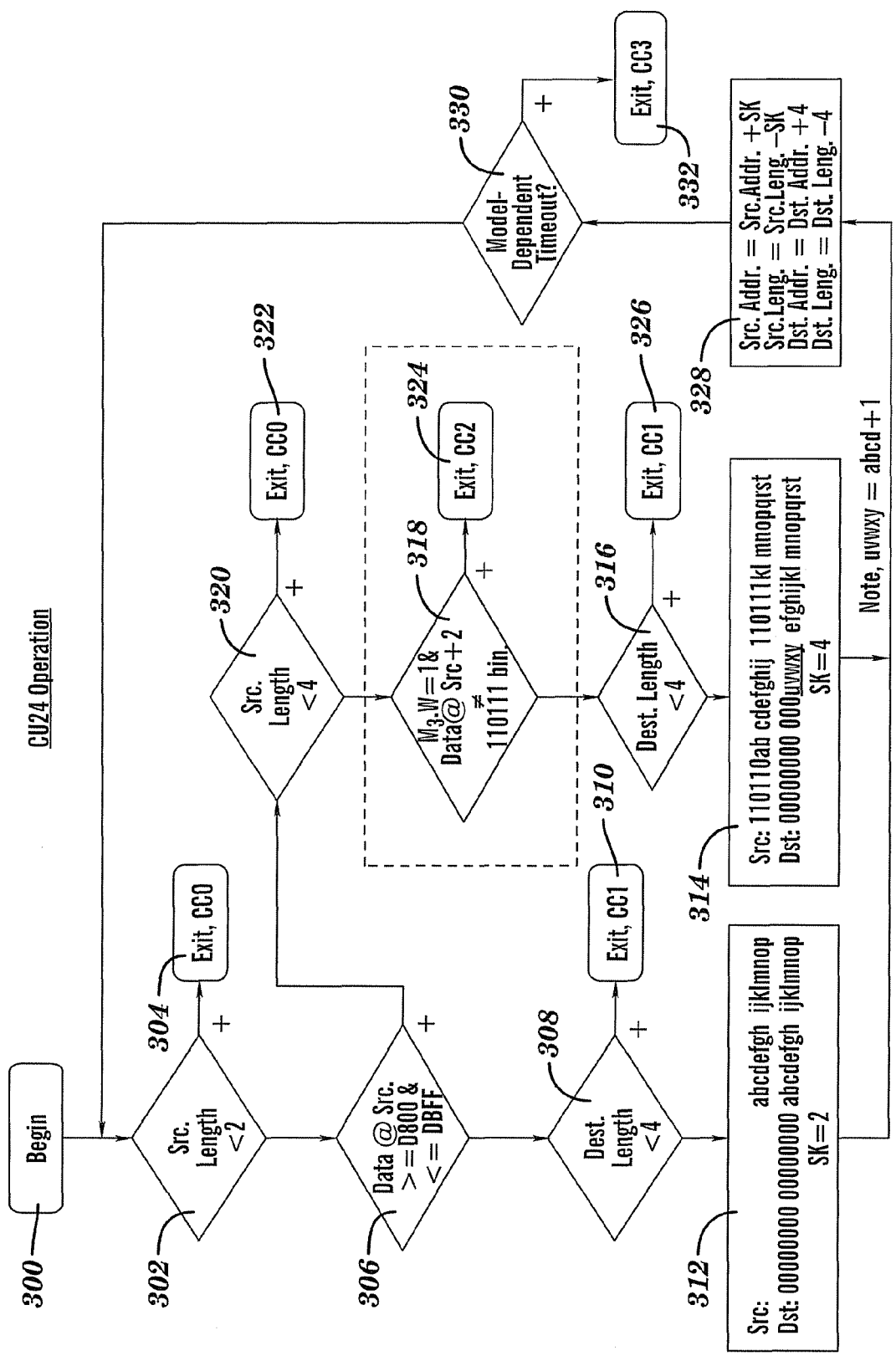
FIG. 3 is a flow chart depicting the processing of the CU24 Operation according to an embodiment of the present invention.

FIG. 3 illustrates the operation of the CU24 instruction (with the ETF3-enhancement facility related steps enclosed by dotted lines), beginning at (300).

1. If the remaining length of the source operand (206) is less than two bytes (302), then the source operand is exhausted, and execution ends by setting condition code zero (304).
2. If the value, of the next two bytes of the source operand, is between D800 and DBFF (306), the data represent a Unicode surrogate pair. In this case, the following steps occur:
   a. A Unicode surrogate pair comprises two two-byte fields (a Unicode high surrogate and a Unicode low surrogate). If the remaining length of the source operand is less than four bytes (320), then the source operand is exhausted, and execution ends by setting condition code zero (322).
   b. If the ETF3-enhancement facility is installed and the enhanced-well-formedness-checking control (W) is one in the $M_3$ field, then the first six bits of the Unicode low surrogate must contain 110111 binary (318). Otherwise, the instruction ends by setting condition code 2 (324) indicating an invalid Unicode low surrogate.
   c. If the remaining length of the destination operand (210) is less than four bytes (316), then the destination operand is full, and the instruction completes by setting condition code one (326).
   d. The Unicode surrogate pair is moved from the source operand to the destination operand (314). The bit fields of the source operand identified by letters are placed in the fields having the corresponding letters in the destination operand, excepting that the a value of one is added to the source bits "abcd" to form the destination field "uvwxy". The destination field is prefixed by binary zeros on the left to form a 32-bit result.
3. If the value of the next two source bytes are not between D800 and DBFF (306), then processing is as follows:
   a. If the remaining length of the destination operand is less than four bytes (308), then the destination operand is full, and the instruction completes by setting condition code one (310).
   b. The 16 bits of the source operand, prefixed by 16 binary zeros, are placed in the destination operand (312).
4. The source address is incremented by the number of source bytes processed (2 for regular characters, 4 for a Unicode surrogate pair, as represented by SK), and the source length is decremented by the same amount. The destination address is incremented by four bytes, and the destination length is decremented by four bytes (328).
5. If a model-dependent number of bytes have been processed (330), the instruction is completed by setting condition code 3 (332). Otherwise, processing continues with the next source characters.

Unpredictable results can occur in the following situations:
When the register designating the first operand ($R_1$) is the same register as that designating the second operand ($R_2$) (that is, the destination and source fields overlap).
When the second operand overlaps the first operand.

Access exceptions for the portions of the operands to the right of the last byte processed may or may not be recognized. For an operand longer than 4K bytes, access exceptions are not recognized for locations more than 4K bytes beyond the last byte processed. When the length of an operand is zero, no access exceptions are recognized for that operand. Access exceptions are not recognized for an operand if the R field associated with that operand is odd.

Resulting Condition Code:

| | |
|---|---|
| 0 | Entire second operand processed |
| 1 | End of first operand reached |
| 2 | Invalid Unicode low surrogate |
| 3 | CPU-determined number of characters converted |

When condition code 3 is set, the program can simply branch back to the instruction to continue the conversion. The program need not determine the number of first-operand or second-operand bytes that were processed.

Table 3. summarizes the CONVERT UTF-16 TO UTF-8 instruction under the EFT3-enhancement facility.

TABLE 3

CONVERT UTF-16 TO UTF-8
CONVERT UNICODE TO UTF-8

CU21  $R_1, R_2$ [,$M_3$]           [RRF]
CUUTF $R_1, R_2$ [,$M_3$]           [RRF]

The operation of the CONVERT UTF-16 TO UTF-8 is as follows. The two-byte Unicode characters of the second operand are converted to UTF-8 characters and placed at the first-operand location. The UTF-8 characters are one, two, three, or four bytes, depending on the Unicode characters that are converted. The operation proceeds until the end of the first or second operand is reached or a CPU-determined number of characters have been converted, whichever occurs first. The result is indicated in the condition code.

The $R_1$ and $R_2$ fields each designate an even-odd pair of general registers and must designate an even-numbered register; otherwise, a specification exception is recognized.

The location of the leftmost byte of the first operand and the second operand is designated by the contents of general registers $R_1$ and $R_2$, respectively. In the 24-bit or 31-bit addressing mode, the number of bytes in the first-operand and second-operand locations is specified by the contents of bit positions 32-63 of general registers $R_1+1$ and $R_2+1$, respectively, and those contents are treated as 32-bit unsigned binary integers. In the 64-bit addressing mode, the number of bytes in the first-operand and second-operand locations is specified by the entire contents of general registers $R_1+1$ and $R_2+1$, respectively, and those contents are treated as 64-bit unsigned binary integers.

FIG. 1A-1C illustrate the handling of the addresses in general registers $R_1$ and $R_2$, which is dependent on the addressing mode. In the 24-bit addressing mode (FIG. 1A), the contents of bit positions 40-63 of general registers $R_1$ and $R_2$ constitute the address, and the contents of bit positions 0-39 are ignored. In the 31-bit addressing mode (FIG. 1B), the contents of bit positions 33-63 of the registers constitute the address, and the contents of bit positions 0-32 are ignored. In the 64-bit addressing mode (FIG. 1C), the contents of bit positions 0-63 constitute the address.

The characters of the second operand are selected one by one for conversion, proceeding left to right. The bytes resulting from a conversion are placed at the first-operand location, proceeding left to right. The operation proceeds until the first-operand or second-operand location is exhausted, a CPU-determined number of second-operand characters have been converted, or when the ETF3-enhancement facility is installed and the W bit is one, until an invalid UTF low surrogate is encountered in the second operand.

To show the method of converting a Unicode character to a UTF-8 character, the bits of a Unicode character are identified by letters as follows:

| | | |
|---|---|---|
| Unicode Character | | 111111 |
| Bit Numbers | 01234567 | 89012345 |
| Identifying Bit Letters | abcdefgh | ijklmnop |

In the case of a Unicode surrogate pair, which is a character pair consisting of a character called a high surrogate followed by a character called a low surrogate, the bits are identified by letters as follows:

| | | |
|---|---|---|
| Unicode High Surrogate | | 111111 |
| Bit Numbers | 01234567 | 89012345 |
| Identifying Bit Letters | 110110ab | cdefghij |
| Unicode Low Surrogate | 11112222 | 22222233 |
| Bit Numbers | 67890123 | 45678901 |
| Identifying Bit Letters | 110111kl | mnopqrst |

Any Unicode character in the range 0000 to 007F hex is converted to a one-byte UTF-8 character as follows:

| | | |
|---|---|---|
| Unicode Character | 00000000 | 0jklmnop |
| UTF-8 Character | 0jklmnop | |

Any Unicode character in the range 0080 to 07FF hex is converted to a two-byte UTF-8 character as follows:

| | | |
|---|---|---|
| Unicode Character | 00000fgh | ijklmnop |
| UTF-8 Character | 110fghij | 10klmnop |

Any Unicode character in the range 0800 to D7FF and DC00 to FFFF hex is converted to a three-byte UTF-8 character as follows:

| | | | |
|---|---|---|---|
| Unicode Character | abcdefgh | ijklmnop | |
| UTF-8 Character | 1110abcd | 10efghij | 10klmnop |

Any Unicode surrogate pair starting with a high surrogate in the range D800 to DBFF hex is converted to a four-byte UTF-8 character as follows:

| | | | | |
|---|---|---|---|---|
| Unicode Characters | 110110ab | cdefghij | 110111kl | mnopqrst |
| UTF-8 Character | 11110uvw | 10xyefgh | 10ijklmn | 10opqrst | where uvwxy = abcd + 1

When the ETF3-enhancement facility is not installed, or when the W bit of the $M_3$ field is zero, the first six bits of the Unicode low surrogate are ignored. When the ETF3-enhancement facility is installed, and the W bit is one, the first six bits Unicode low surrogate must contain 110111 binary; otherwise, the Unicode low surrogate is invalid, and condition code 2 is set.

The second-operand location is considered exhausted when it does not contain at least two remaining bytes or at least four remaining bytes when the first two bytes are a Unicode high surrogate. The first-operand location is considered exhausted when it does not contain at least the one, two, three, or four remaining bytes required to contain the UTF-8 character resulting from the conversion of the next second-operand character or surrogate pair.

When the second-operand location is exhausted, condition code 0 is set. When the first-operand location is exhausted, condition code 1 is set, except that condition code 0 is set if the second-operand location also is exhausted. When a CPU-determined number of characters have been converted, condition code 3 is set.

When the conditions for setting condition codes 1 and 2 are both met, condition code 2 is set.

When the operation is completed, the contents of general register $R_2+1$ are decremented by the number of bytes converted, and the contents of general register $R_2$ are incremented by the same number. Also, the contents of general register $R_1+1$ are decremented by the number of bytes placed at the first-operand location, and the contents of general register $R_1$ are incremented by the same number. When general registers $R_1$ and $R_2$ are updated in the 24-bit or 31-bit addressing mode, bits 32-39 of them, in the 24-bit mode, or bit 32, in the 31-bit mode, may be set to zeros or may remain unchanged. In the 24-bit or 31-bit addressing mode, the contents of bit positions 0-31 of general registers $R_1$, $R_1+1$, $R_2$, and $R_2+1$, always remain unchanged.

When condition code 3 is set, the registers have been updated so that the instruction, when re-executed, resumes at the next byte locations to be processed. The CPU on the basis of improving system performance determines the amount of processing that results in the setting of condition code 3, and it may be a different amount each time the instruction is executed.

Figure 4:
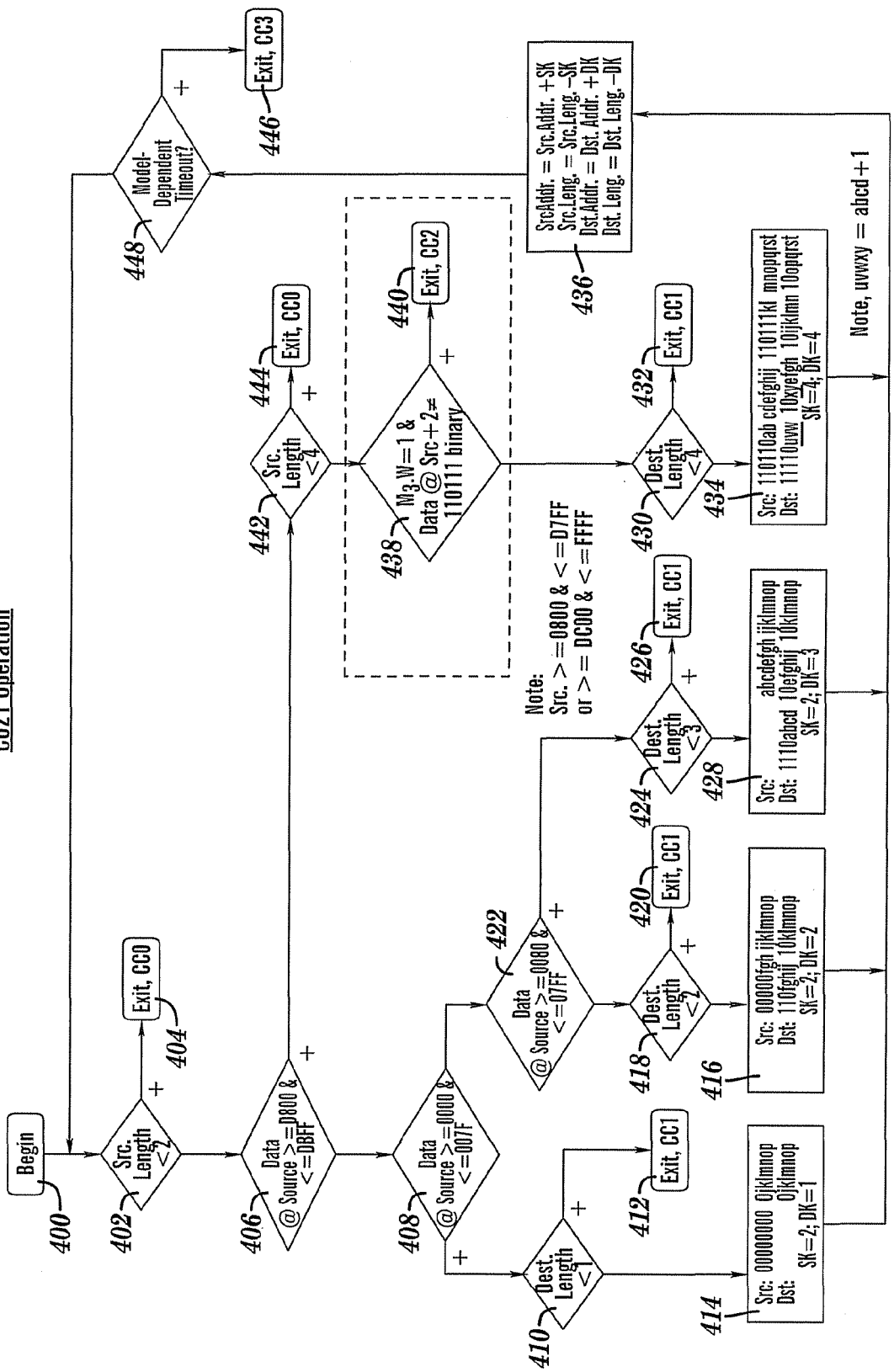
FIG. 4 is a flow chart depicting the processing of the CU21 Operation according to an embodiment of the present invention.

FIG. 4 illustrates the operation of the CU21 instruction (with the ETF3-enhancement facility related steps enclosed by dotted lines), beginning at (400).

1. If the remaining length of the source operand (206) is less than two bytes (402), then the source operand is exhausted, and execution ends by setting condition code zero (404).
2. If the value of the next two bytes of source operand is between D800 and DBFF (406), the data represent a Unicode surrogate pair. In this case, the following steps occur:
   a. A Unicode surrogate pair comprises two two-byte fields (a Unicode high surrogate and a Unicode low surrogate). If the remaining length of the source operand is less than four bytes (442), then the source operand is exhausted, and execution ends by setting condition code zero (444).
   b. If the ETF3-enhancement facility is installed and the enhanced-well-formedness-checking control (W) is one in the $M_3$ field, then the first six bits of the Unicode low surrogate must contain 110111 binary (438). Otherwise, the instruction ends by setting condition code 2 (440) indicating an invalid Unicode low surrogate.
   c. If the remaining length of the destination operand (210) is less than four bytes (430), then the destination operand is full, and the instruction completes by setting condition code one (432).
   d. The Unicode surrogate pair is moved from the source operand to the destination operand (434). The bit fields of the source operand identified by letters are placed in the fields having the corresponding letters in the destination operand, excepting that the a value of one is added to the source bits "abcd" to form the destination field "uvwxy".
3. If the value of the next two source bytes are between 0000 and 007F (408), then processing is as follows:
   a. If the remaining length of the destination operand is less than one byte (410), then the destination operand is full, and the instruction completes by setting condition code one (412).
   b. Bits j-p of the source operand, prefixed by one binary 0, are placed in the destination operand (414).
4. If the value of the next two source bytes are between 0080 and 07FF (422), then processing is as follows:
   a. If the remaining length of the destination operand is less than two bytes (418), then the destination operand is full, and the instruction completes by setting condition code one (420).
   b. Bits f-j of the source operand, prefixed by 110 binary are placed in the first byte of the destination, and bits k-p of the source operand, prefixed by 10 binary are placed in the second byte of the destination (416).
5. If the preceding source-operand cases are not taken, then the source operand must be between either 0800-D7FF and DC00-FFFF. In this case, processing is as follows:
   a. If the remaining length of the destination operand is less than three bytes (424), then the destination operand is full, and the instruction completes by setting condition code one (426).
   b. Bits a-d of the source operand, prefixed by 1110 binary are placed in the first byte of the destination, bits e-j of the source operand, prefixed by 10 binary are placed in the second byte of the destination, and bits k-p of the source operand, prefixed by 10 binary are placed in the third byte of the destination (428).
6. The source address is incremented by the number of source bytes processed (Either 2 or 4, as represented by SK), and the source length is decremented by the same amount. The destination address is incremented by the number of destination bytes processed (either 1, 2, or 3, as represented by DK), and the destination length is decremented by the same amount (436).
7. If a model-dependent number of bytes have been processed (448), the instruction is completed by setting condition code 3 (446). Otherwise, processing continues with the next source characters.

Unpredictable results can occur in the following situations:

When the register designating the first operand (RI) is the same register as that designating the second operand ($R_2$) (that is, the destination and source fields overlap).

When the second operand overlaps the first operand.

Access exceptions for the portions of the operands to the right of the last byte processed may or may not be recognized. For an operand longer than 4K bytes, access exceptions are not recognized for locations more than 4K bytes beyond the last byte processed. When the length of an operand is zero, no access exceptions are recognized for that operand. Access exceptions are not recognized for an operand if the R field associated with that operand is odd.

Resulting Condition Code:

| | |
|---|---|
| 0 | Entire second operand processed |
| 1 | End of first operand reached |
| 2 | Invalid Unicode low surrogate |
| 3 | CPU-determined number of characters converted |

When condition code 3 is set, the program can simply branch back to the instruction to continue the conversion. The program need not determine the number of first-operand or second-operand bytes that were processed.

Table 4. summarizes the CONVERT UTF-8 TO UTF-16 instruction under the EFT3-enhancement facility.

TABLE 4

CONVERT UTF-8 TO UTF-16
CONVERT UTF-8 TO UNICODE

| CU12 $R_1, R_2$ [,$M_3$] | [RRF] |
| CUTFU $R_1, R_2$ [,$M_3$] | [RRF] |

| 'B2A7' | $M_3$ | | $R_1$ | $R_2$ |
|---|---|---|---|---|
| 0 | 16 | 20 | 24 | 28  31 |

The operation of the CONVERT UTF-8 TO UTF-16 is as follows. The one-, two-, three-, or four-byte UTF-8 characters of the second operand are converted to two-byte Unicode characters and placed at the first-operand location. The operation proceeds until the end of the first or second operand is reached, a CPU-determined number of characters have been converted, or an invalid UTF-8 character is encountered, whichever occurs first. The result is indicated in the condition code.

The $R_1$ and $R_2$ fields each designate an even-odd pair of general registers and must designate an even-numbered register; otherwise, a specification exception is recognized.

The location of the leftmost byte of the first operand and the second operand is designated by the contents of general registers $R_1$ and $R_2$, respectively. In the 24-bit or 31-bit addressing mode, the number of bytes in the first-operand and second-operand locations is specified by the contents of bit positions 32-63 of general registers $R_1+1$ and $R_2+1$, respectively, and those contents are treated as 32-bit unsigned binary integers. In the 64-bit addressing mode, the number of bytes in the first-operand and second-operand locations is specified by the entire contents of general registers $R_1+1$ and $R_2+1$, respectively, and those contents are treated as 64-bit unsigned binary integers.

FIGS. 1A-1C illustrate the handling of the addresses in general registers $R_1$ and $R_2$, which is dependent on the addressing mode. In the 24-bit addressing mode (FIG. 1A), the contents of bit positions 40-63 of general registers $R_1$ and $R_2$ constitute the address, and the contents of bit positions 0-39 are ignored. In the 31-bit addressing mode (FIG. 1B), the contents of bit positions 33-63 of the registers constitute the address, and the contents of bit positions 0-32 are ignored. In the 64-bit addressing mode (FIG. 1C), the contents of bit positions 0-63 constitute the address.

The characters of the second operand are selected one by one for conversion, proceeding left to right. The bytes resulting from a conversion are placed at the first-operand location, proceeding left to right. The operation proceeds until the first-operand or second-operand location is exhausted, a CPU-determined number of second-operand characters have been converted, or an invalid UTF-8 character is encountered in the second operand.

To show the method of converting a UTF-8 character to a Unicode character, the bits of a Unicode character are identified by letters as follows:

| Unicode Character | | 111111 |
|---|---|---|
| Bit Numbers | 01234567 | 89012345 |
| Identifying Bit Letters | abcdefgh | ijklmnop |

In the case of a Unicode surrogate pair, which is a character pair consisting of a character called a high surrogate followed by a character called a low surrogate, the bits are identified by letters as follows:

| Unicode High Surrogate | | 111111 |
|---|---|---|
| Bit Numbers | 01234567 | 89012345 |
| Identifying Bit Letters | 110110ab | cdefghij |
| Unicode Low Surrogate | 11112222 | 22222233 |
| Bit Numbers | 67890123 | 45678901 |
| Identifying Bit Letters | 110111kl | mnopqrst |

Conversion of a UTF-8 character to a Unicode character is as follows:

When the contents of the first byte of a UTF-8 character are in the range 00 to 7F hex, the character is a one-byte character, and it is converted to a two-byte Unicode character as follows:

| UTF-8 Character | 0jklmnop | |
|---|---|---|
| Unicode Character | 00000000 | 0jklmnop |

When the contents of the first byte of the UTF-8 character are in the range 80 to BF hex, the character is invalid. When the ETF3-enhancement facility is installed, the W bit of the $M_3$ field is one, and the contents of the first byte of the UTF-8 character are in the range C0 to C1 hex, the character is also invalid.

When the ETF3-enhancement facility is not installed or the W bit of the $M_3$ field is zero, and the contents of the first byte of the UTF-8 character are in the range of C0 to DF hex; or when the ETF3-enhancement facility is installed, the W bit is one, and the contents of the first byte of the UTF-8 character are in the range of C2 to DF hex; the character is a two-byte character, and it is converted to a two-byte Unicode character as follows:

| UTF-8 Character | 110fghij | 10klmnop |
|---|---|---|
| Unicode Character | 00000fgh | ijklmnop |

When the ETF3-enhancement facility is not installed or when the W bit of the $M_3$ field is zero, the first two bits in the second byte of the UTF-8 character are ignored. When the ETF3-enhancement facility is installed and the W bit of the M3 field is one, the second byte of the UTF-8 character must be in the range 80 to BF; otherwise the character is invalid.

When the contents of the first byte of a UTF-8 character are in the range E0 to EF hex, the character is a three-byte character, and it is converted to a two-byte Unicode character as follows:

| UTF-8 Character | 1110abcd | 10efghij | 10klmnop |
|---|---|---|---|
| Unicode Character | abcdefgh | ijklmnop | |

When the ETF3-enhancement facility is not installed or when the W bit of the $M_3$ field is zero, the first two bits in the second and third bytes of the UTF-8 character are ignored.

When the ETF3-enhancement facility is installed and the W bit of the $M_3$ field is one, the contents of the second and third bytes of the UTF-8 character must be as follows:
  When the first byte is E0 hex, the second and third bytes must be in the ranges A0 to BF and 80 to BF, respectively.
  When the first byte is in the range E1 to EC hex or EE to EF, the second and third bytes must both be in the range 80 to BF hex.
  When the first byte is ED hex, the second and third bytes must be in the ranges 80 to 9F and 80 to BF, respectively.
  Otherwise, the character is invalid.

When the ETF3-enhancement facility is not installed or the W bit of the $M_3$ field is zero, and the contents of the first byte of the UTF-8 character are in the range of F0 to F7 hex; or when the ETF3-enhancement facility is installed, the W bit is one, and the contents of the first byte of the UTF-8 character are in the range of F0 to F4 hex; the character is a four-byte character, and it is converted to two two-byte Unicode characters (a surrogate pair) as follows:

| UTF-8 Character | 11110uvw | 10xyefgh | 10ijklmn | 10opqrst |
|---|---|---|---|---|
| Unicode Characters | 110110ab | cdefghij | 110111kl | mnopqrst | where zabcd = uvwxy − 1

When the ETF3-enhancement facility is not installed or when the W bit of the $M_3$ field is zero, the first two bits in the second, third, and fourth bytes of the UTF-8 character are ignored, and the high order bit (z) produced by the subtract operation should be zero but is ignored.

When the ETF3-enhancement facility is installed and the W bit of the $M_3$ field is one, the contents of the second, third, and fourth bytes of the UTF-8 character must be as follows:
  When the first byte is F0 hex, the second, third, and fourth bytes must be in the ranges 90 to BF, 80 to BF, and 80 to BF, respectively.
  When the first byte is in the range F1 to F3, the second, third, and fourth bytes must all be in the range 80 to BF hex.
  When the first byte is F4 hex, the second, third, and fourth bytes must be in the ranges 80 to 8F, 80 to BF, and 80 to BF, respectively.
  Otherwise, the character is invalid.

When the ETF3-enhancement facility is installed, the W bit of the $M_3$ field is one, and the contents of the first byte of the UTF-8 character are in the range of F5 to F7 hex, the character is invalid.

When the contents of the first byte of the UTF-8 character are in the range of F8-FF, the character is invalid.

If an invalid character is encountered, condition code 2 is set, and general register $R_2$ contains the address of the first byte of the invalid UTF-8 character.

The second-operand location is considered exhausted when it does not contain at least one remaining byte or when it does not contain at least the two, three, or four remaining bytes required to contain the two-, three-, or four-byte UTF-8 character indicated by the contents of the first remaining byte. The first-operand location is considered exhausted when it does not contain at least two remaining bytes or at least four remaining bytes in the case when a four byte UTF-8 character is to be converted.

When the second-operand location is exhausted, condition code 0 is set. When the first-operand location is exhausted, condition code 1 is set, except that condition code 0 is set if the second-operand location also is exhausted. When a CPU-determined number of characters have been processed, condition code 3 is set. When the conditions for setting condition codes 1 and 2 are both met, condition code 2 is set.

When the operation is completed, the contents of general register $R_2+1$ are decremented by the number of bytes converted, and the contents of general register $R_2$ are incremented by the same number. Also, the contents of general register $R_1+1$ are decremented by the number of bytes placed at the first-operand location, and the contents of general register $R_1$ are incremented by the same number. When general registers $R_1$ and $R_2$ are updated in the 24-bit or 31-bit addressing mode, bits 32-39 of them, in the 24-bit mode, or bit 32, in the 31-bit mode, may be set to zeros or may remain unchanged. In the 24-bit or 31-bit addressing mode, the contents of bit positions 0-31 of general registers $R_1$, $R_1+1$, $R_2$, and $R_2+1$, always remain unchanged.

When condition code 3 is set, the registers have been updated so that the instruction, when re-executed, resumes at the next byte locations to be processed. The CPU on the basis of improving system performance determines the amount of processing that results in the setting of condition code 3, and it may be a different amount each time the instruction is executed.

Figure 5A:
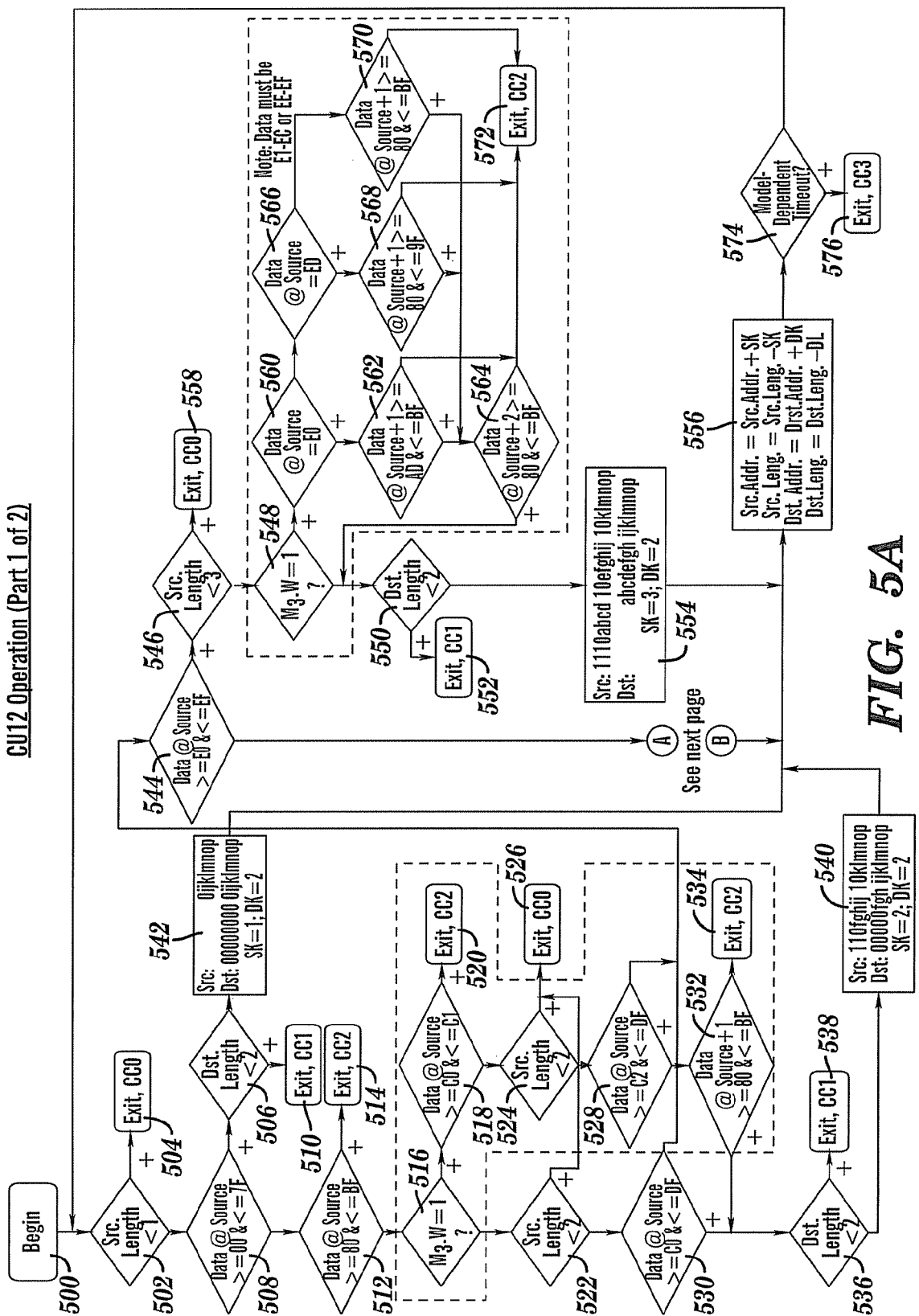
FIGS. 5A and 5B are flow charts depicting the processing of the CU12 Operation according to an embodiment of the present invention.
Figure 5B:
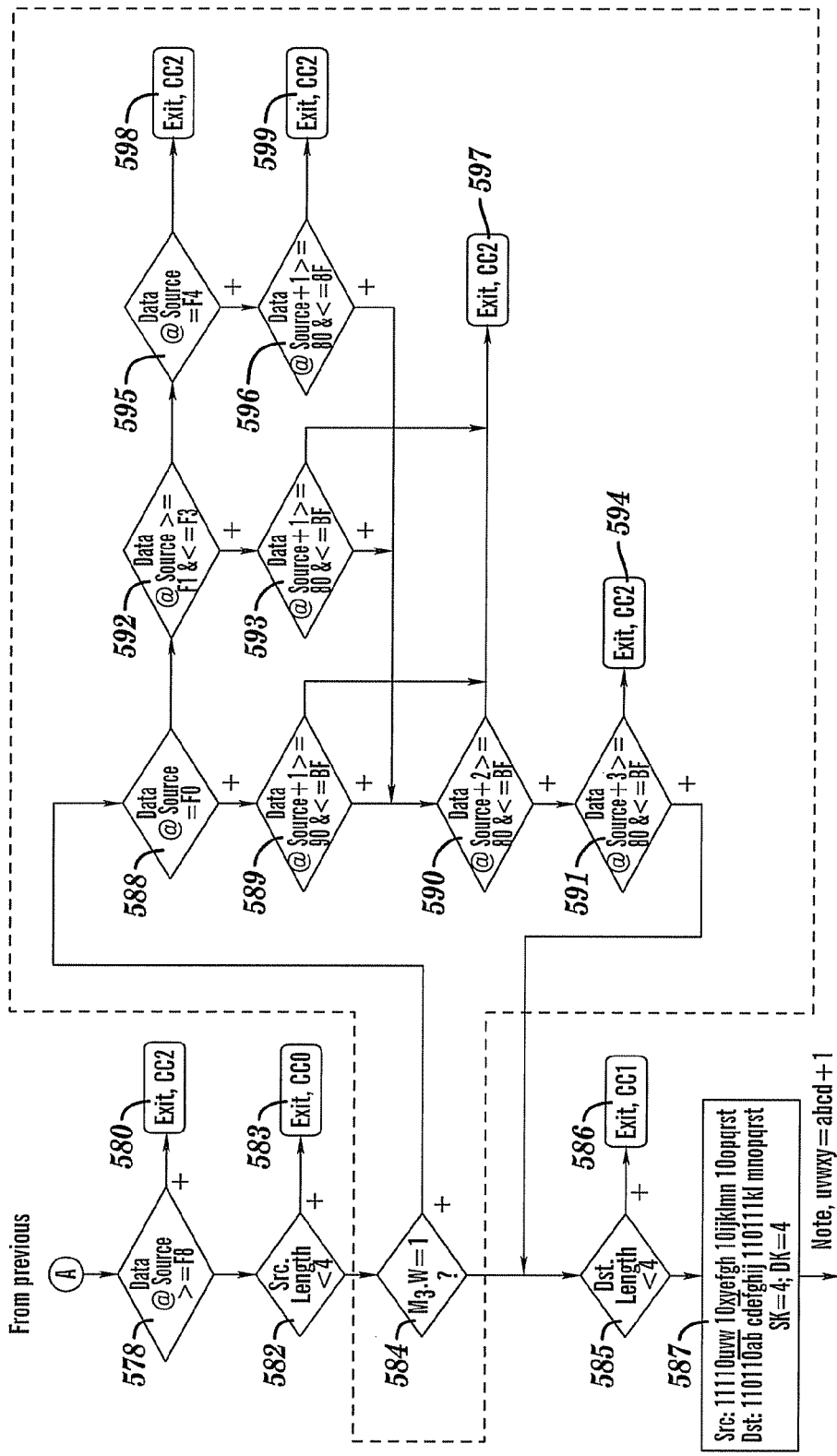

FIGS. 5A and 5B illustrate the operation of the CU12 instruction (with the ETF3-enhancement facility related steps enclosed by dotted lines), beginning at (500) in FIG. 5A.
  1. If the remaining length of the source operand (206) is less than one byte (502), then the source operand is exhausted, and execution ends by setting condition code zero (504).
  2. If the value of the next byte of the source operand is between 00 and 7F (508), then processing is as follows:
    a. If the remaining length of the destination operand is less than two bytes (506), then the destination operand is full, and the instruction completes by setting condition code one (510).
    b. Bits k-p of the source operand, prefixed by nine binary zeros, are placed in the two bytes of the destination operand location (542).
  3. If the value of the next byte of the source operand is between 80 and BF (512), then the source character is invalid, and the instruction completes by setting condition code two (514).
  4. If the ETF3-enhancement facility is installed and the well-formedness-checking control (W), bit 3 of the $M_3$ field, is one (516), then processing is as follows:

a. If the value of the next byte of the source operand is between C0 and C1 (518), then the source character is invalid, and the instruction completes by setting condition code two (520).
b. If the remaining length of the source operand is less than two bytes (524), then the source operand is exhausted, and execution ends by setting condition code zero (526).
c. If the value of the next byte of the source operand is not between C2 and CF (528), then processing continues with step 6 (544).
d. If the second byte of the source character is not between 80 and BF (532), then the character is invalid, and the instruction completes by setting condition code two (534).
e. If the remaining length of the destination operand is less than two bytes (536), then the destination operand is full, and the instruction completes by setting condition code one (538).
f. Bits f-h of the source operand, prefixed by five binary zeros are placed in the first byte of the destination location. Bits i-p of the source operand, are placed in the second byte of the destination operand (540).

5. If the ETF3-enhancement facility is not installed or the well-formedness-checking control is zero (516), then processing is as follows:
    a. If the remaining length of the source operand is less than two bytes (522), then the source operand is exhausted, and execution ends by setting condition code zero (526).
    b. If the value of the next byte of the source operand is not between C0 and DF (530), then processing continues with step 6 (544).
    c. If the remaining length of the destination operand is less than two bytes (536), then the destination operand is full, and the instruction completes by setting condition code one (538).
    d. Bits f-h of the source operand, prefixed by five binary zeros are placed in the first byte of the destination location. Bits i-p of the source operand, are placed in the second byte of the destination operand (540).

6. If the value of the next byte of the source operand is between E0 and EF (544), then processing is as follows:
    a. If the remaining length of the source operand is less than three bytes (546), then the source operand is exhausted, and execution ends by setting condition code zero (558).
    b. If the ETF3-enhancement facility is installed, and the well-formedness-checking control (W) is one (548), then processing is as follows:
        If the value of the next byte of the source operand is E0 (560), then the second and third bytes of the source operand must be in the range of A0-BF (562) and 80-BF (564), respectively. Otherwise, the character is invalid, and the instruction completes by setting condition code two (572).
        If the value of the next byte of the source operand is ED (566), then the second and third bytes of the source operand must be in the range of 80-9F (568) and 80-BF (564), respectively. Otherwise, the character is invalid, and the instruction completes by setting condition code two (572).
        Of necessity, the value of the next source byte must be in the range of E1-EC or EE-EF, in which case, the second and third bytes of the source operand must both be in the range of 80-BF (570 & 564). Otherwise, the character is invalid, and the instruction completes by setting condition code two (572).
    c. If the remaining length of the destination operand is less than two bytes (550), then the destination operand is full, and the instruction completes by setting condition code one (552).
    d. Bits a-h of the source operand are placed in the first byte of the destination location. Bits i-p of the source operand, are placed in the second byte of the destination operand (544).

7. Referring to FIG. 5B, if the value of the next byte of the source operand is greater than or equal to F8 (578), then the character is invalid, and the instruction completes by setting condition code two (580).

8. Of necessity, the value of the next byte of the source operand must be in the range of F0-F7, and processing is as follows:
    a. If the remaining length of the source operand is less than four bytes (582), then the source operand is exhausted, and execution ends by setting condition code zero (583).
    b. If the ETF3-enhancement facility is installed, and the well-formedness-checking control (W) is one (584), then processing is as follows:
        If the value of the next byte of the source operand is F0 (588), then the second, third, and fourth bytes of the source operand must be in the range of 90-BF (589), 80-BF (590), and 80-BF (591), respectively. Otherwise, the character is invalid, and the instruction completes by setting condition code two (597 or 594).
        If the value of the next byte of the source operand is between F1 and F3 (592), then the second, third, and fourth bytes of the source operand must all be in the range of 80-BF (593, 590, & 591). Otherwise, the character is invalid, and the instruction completes by setting condition code two (597 or 594).
        If the value of the next byte of the source operand is F4 (595), then the second, third, and fourth bytes of the source operand must be in the range of 80-8F (596), 80-BF (590) and 80-BF (591), respectively. Otherwise, the character is invalid, and the instruction completes by setting condition code two (599, 597, or 594).
        Of necessity, the value of the next source byte must be in the range of F5-F7, in which case the character is invalid, and the instruction completes by setting condition code two (598).

9. Referring again to FIG. 5A, the source address is incremented by the number of source bytes processed (1, 2, 3, or 4, as indicated by "SK"), and the remaining source length is decremented by the same amount. The destination address is incremented by the number of destination bytes processed (2 or 4, as indicated by "DK"), and the remaining destination length is decremented by the same amount. (556)

10. If a model-dependent number of bytes have been processed (574), then the instruction completes by setting condition code three (576). Otherwise, processing resumes at the beginning of this description.

Unpredictable results can occur in the following situations:

When the register designating the first operand ($R_1$) is the same register as that designating the second operand ($R_2$) (that is, the destination and source fields overlap).

When the second operand overlaps the first operand.

Access exceptions for the portions of the operands to the right of the last byte processed may or may not be recognized. For an operand longer than 4K bytes, access exceptions are not recognized for locations more than 4K bytes beyond the last byte processed. When the length of an operand is zero, no access exceptions are recognized for that operand. Access exceptions are not recognized for an operand if the R field associated with that operand is odd.

Resulting Condition Code:

| | |
|---|---|
| 0 | Entire second operand processed |
| 1 | End of first operand reached |
| 2 | Invalid UTF-8 character |
| 3 | CPU-determined number of characters processed |

When condition code 3 is set, the program can simply branch back to the instruction to continue the conversion. The program need not determine the number of first-operand or second-operand bytes that were processed.

When the ETF3-enhancement facility is not installed, or when the W bit of the $M_3$ operand is zero, bits 0 and 1 of the continuation bytes of multiple-byte UTF-8 characters are not checked in order to improve the performance of the conversion. Therefore, invalid continuation bytes are not detected.

Table 5. summarizes the CONVERT UTF-8 TO UTF-32 instruction under the EFT3-enhancement facility.

TABLE 5

CONVERT UTF-8 TO UTF-32

CU14   $R_1$, $R_2$ [,$M_3$]           [RRF]

| 'B9B0' | $M_3$ | ////// | $R_1$ | $R_2$ |
|---|---|---|---|---|
| 0 | 16 | 20 | 24 | 28   31 |

The operation of the CONVERT UTF-8 TO UTF-32 is as follows. The one-, two-, three-, or four-byte UTF-8 characters of the second operand are converted to four-byte UTF-32 characters and placed at the first-operand location. The operation proceeds until the end of the first or second operand is reached, a CPU-determined number of characters have been converted, or an invalid UTF-8 character is encountered, whichever occurs first. The result is indicated in the condition code.

The $R_1$ and $R_2$ fields each designate an even-odd pair of general registers and must designate an even-numbered register; otherwise, a specification exception is recognized.

The location of the leftmost byte of the first operand and the second operand is designated by the contents of general registers $R_1$ and $R_2$, respectively. In the 24-bit or 31-bit addressing mode, the number of bytes in the first-operand and second-operand locations is specified by the contents of bit positions 32-63 of general registers $R_1$+1 and $R_2$+1, respectively, and those contents are treated as 32-bit unsigned binary integers. In the 64-bit addressing mode, the number of bytes in the first-operand and second-operand locations is specified by the entire contents of general registers $R_1$+1 and $R_2$+1, respectively, and those contents are treated as 64-bit unsigned binary integers.

FIG. 1A-1C illustrate the handling of the addresses in general registers $R_1$ and $R_2$, which is dependent on the addressing mode. In the 24-bit addressing mode (FIG. 1A), the contents of bit positions 40-63 of general registers $R_1$ and $R_2$ constitute the address, and the contents of bit positions 0-39 are ignored. In the 31-bit addressing mode (FIG. 1B), the contents of bit positions 33-63 of the registers constitute the address, and the contents of bit positions 0-32 are ignored. In the 64-bit addressing mode (FIG. 1C), the contents of bit positions 0-63 constitute the address.

The characters of the second operand are selected one by one for conversion, proceeding left to right. The bytes resulting from a conversion are placed at the first-operand location, proceeding left to right. The operation proceeds until the first-operand or second-operand location is exhausted, a CPU-determined number of second-operand characters have been converted, or an invalid UTF-8 character is encountered in the second operand.

To show the method of converting a UTF-8 character to a UTF-32 character, the bits of a UTF-32 character in the range 00000000 to 0000D7FF and 0000DC00 to 0000FFFF hex are identified by letters as follows:

| UTF-32 Character Bit Numbers | | 111111 | 11112222 | 22222233 |
|---|---|---|---|---|
| | 01234567 | 89012345 | 67890123 | 45678901 |
| Identifying Bit Letters | 00000000 | 00000000 | abcdefgh | ijklmnop |

The bits of a UTF-32 character in the range 00010000 0010FFFF hex (UTF-16 surrogate pair) are identified by letters as follows:

| UTF-32 Character Bit Numbers | | 111111 | 11112222 | 22222233 |
|---|---|---|---|---|
| | 01234567 | 89012345 | 67890123 | 45678901 |
| Identifying Bit Letters | 00000000 | 000uvwxy | efghijkl | mnopqrst |

Conversion of a UTF-8 character to a UTF-32 character is as follows:

When the contents of the first byte of a UTF-8 character are in the range 00 to 7F hex, the character is a one-byte character, and it is converted to a four-byte UTF-32 character as follows:

| UTF-8 Character | 0jklmnop | | | |
|---|---|---|---|---|
| UTF-32 Character | 00000000 | 00000000 | 00000000 | 0jklmnop |

When the contents of the first byte of the UTF-8 character are in the range 80 to BF hex, the character is invalid. When the ETF3-enhancement facility is installed, the W bit of the $M_3$ field is one, and the contents of the first byte of the UTF-8 character are in the range C0 to C1 hex, the character is also invalid.

When the ETF3-enhancement facility is not installed or the W bit of the $M_3$ field is zero, and the contents of the first byte of the UTF-8 character are in the range of C0 to DF hex; or when the ETF3-enhancement facility is installed, the W bit is one, and the contents of the first byte of the UTF-8 character are in the range of C2 to DF hex; the character is a two-byte character, and it is converted to a four-byte UTF-32 character as follows:

| UTF-8 Character | 110fghij | 10klmnop | | |
|---|---|---|---|---|
| UTF-32 Character | 00000000 | 00000000 | 00000fgh | ijklmnop |

When the ETF3-enhancement facility is not installed or when the W bit of the $M_3$ field is zero, the first two bits in the second byte of the UTF-8 character are ignored. When the ETF3-enhancement facility is installed and the W bit of the $M_3$ field is one, the contents of the second byte of the UTF-8 character must be in the range 80 to BF; otherwise the character is invalid.

When the contents of the first byte of a UTF-8 character are in the range E0 to EF hex, the character is a three-byte character, and it is converted to a four-byte UTF-32 character as follows:

| UTF-8 Character | 1110abcd | 10efghij | 10klmnop | |
|---|---|---|---|---|
| UTF-32 Character | 00000000 | 00000000 | abcdefgh | ijklmnop |

When the ETF3-enhancement facility is not installed or when the W bit of the $M_3$ field is zero, the first two bits in the second and third bytes of the UTF-8 character are ignored. When the ETF3-enhancement facility is installed and the W bit of the $M_3$ field is one, the contents of the second and third bytes of the UTF-8 character must be as follows:

When the first byte is E0 hex, the second and third bytes must be in the ranges A0 to BF and 80 to BF, respectively.

When the first byte is in the range E1 to EC hex or EE to EF, the second and third bytes must both be in the range 80 to BF hex.

When the first byte is ED hex, the second and third bytes must be in the ranges 80 to 9F and 80 to BF, respectively.

Otherwise, the character is invalid.

When the ETF3-enhancement facility is not installed or the W bit of the $M_3$ field is zero, and the contents of the first byte of the UTF-8 character are in the range of F0 to F7 hex; or when the ETF3-enhancement facility is installed, the W bit is one, and the contents of the first byte of the UTF-8 character are in the range of F0 to F4 hex; the character is a four-byte character, and it is converted to a four-byte UTF-32 character (a surrogate pair) as follows:

| UTF-8 Character | 11110uvw | 10xyefgh | 10ijklmn | 10opqrst |
|---|---|---|---|---|
| UTF-32 Character | 00000000 | 000uvwxy | efghijkl | mnopqrst |

When the ETF3-enhancement facility is not installed or when the W bit of the $M_3$ field is zero, the first two bits in the second, third, and fourth bytes of the UTF-8 character are ignored.

When the ETF3-enhancement facility is installed and the W bit of the $M_3$ field is one, the contents of the second, third, and fourth bytes of the UTF-8 character must be as follows:

When the first byte is F0 hex, the second, third, and fourth bytes must be in the ranges 90 to BF, 80 to BF, and 80 to BF, respectively.

When the first byte is in the range F1 to F3, the second, third, and fourth bytes must all be in the range 80 to BF hex.

When the first byte is F4 hex, the second, third, and fourth bytes must be in the ranges 80 to 8F, 80 to BF, and 80 to BF, respectively.

Otherwise, the character is invalid.

When the ETF3-enhancement facility is installed, the W bit of the $M_3$ field is one, and the contents of the first byte of the UTF-8 character are in the range of F5 to F7 hex, the character is invalid.

When the contents of the first byte of the UTF-8 character are in the range of F8-FF, the character is invalid.

If an invalid character is encountered, condition code 2 is set, and general register $R_2$ contains the address of the first byte of the invalid UTF-8 character.

The second-operand location is considered exhausted when it does not contain at least one remaining byte or when it does not contain at least the two, three, or four remaining bytes required to contain the two-, three-, or four-byte UTF-8 character indicated by the contents of the first remaining byte. The first-operand location is considered exhausted when it does not contain at least four remaining bytes.

When the second-operand location is exhausted, condition code 0 is set. When the first-operand location is exhausted, condition code 1 is set, except that condition code 0 is set if the second-operand location also is exhausted. When a CPU-determined number of characters have been processed, condition code 3 is set. When the conditions for setting condition codes 1 and 2 are both met, condition code 2 is set.

When the operation is completed, the contents of general register $R_2$+1 are decremented by the number of bytes converted, and the contents of general register $R_2$ are incremented by the same number. Also, the contents of general register $R_1$+1 are decremented by the number of bytes placed at the first-operand location, and the contents of general register $R_1$ are incremented by the same number. When general registers $R_1$ and $R_2$ are updated in the 24-bit or 31-bit addressing mode, bits 32-39 of them, in the 24-bit mode, or bit 32, in the 31-bit mode, may be set to zeros or may remain unchanged. In the 24-bit or 31-bit addressing mode, the contents of bit positions 0-31 of general registers $R_1$, $R_1$+1, $R_2$, and $R_2$+1, always remain unchanged.

When condition code 3 is set, the registers have been updated so that the instruction, when re-executed, resumes at the next byte locations to be processed. The CPU on the basis of improving system performance determines the amount of processing that results in the setting of condition code 3, and it may be a different amount each time the instruction is executed.

Figure 6A:
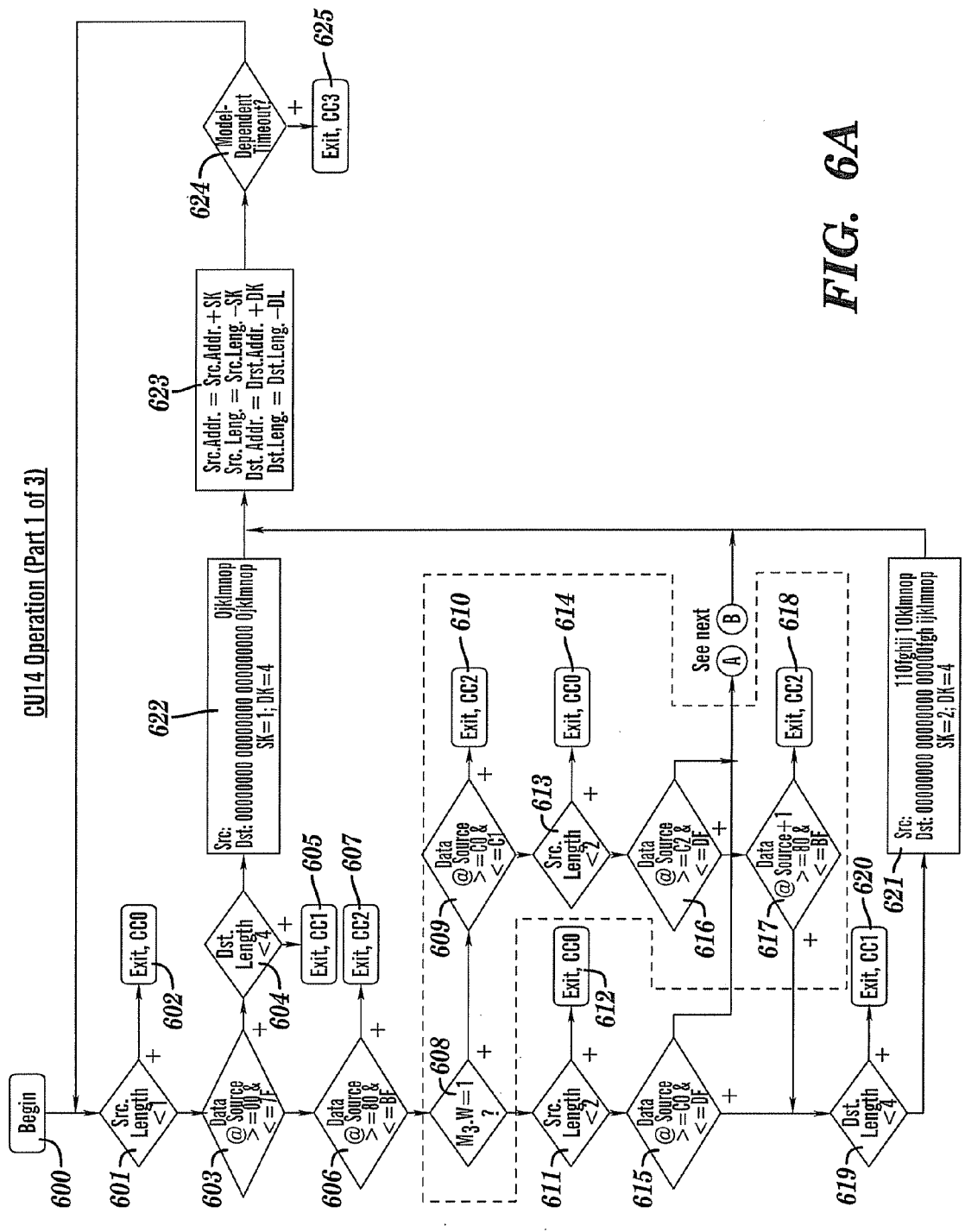
FIGS. 6A, 6B and 6C are flow charts depicting the processing of the CU14 Operation according to an embodiment of the present invention.
Figure 6B:
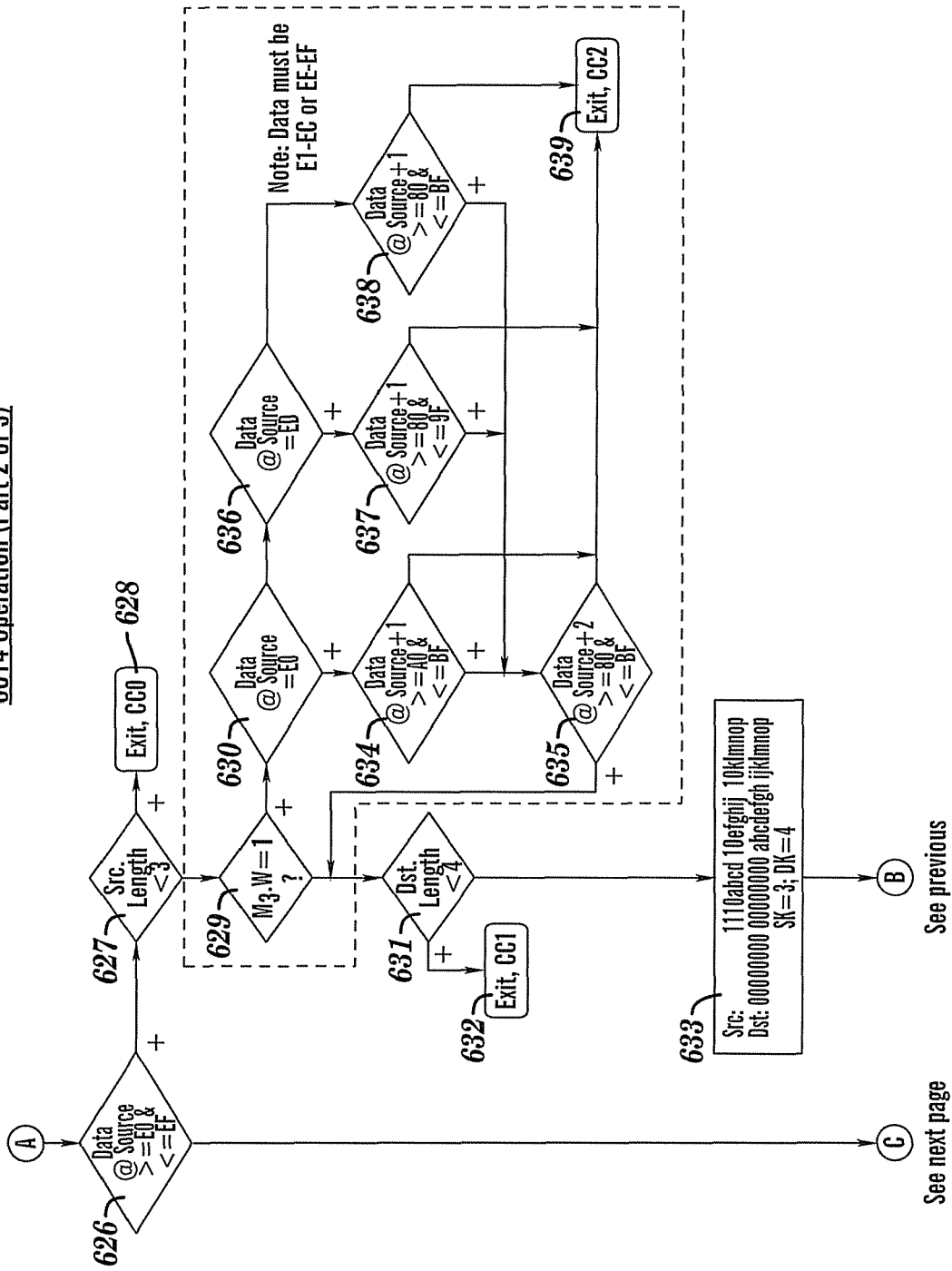
Figure 6C:
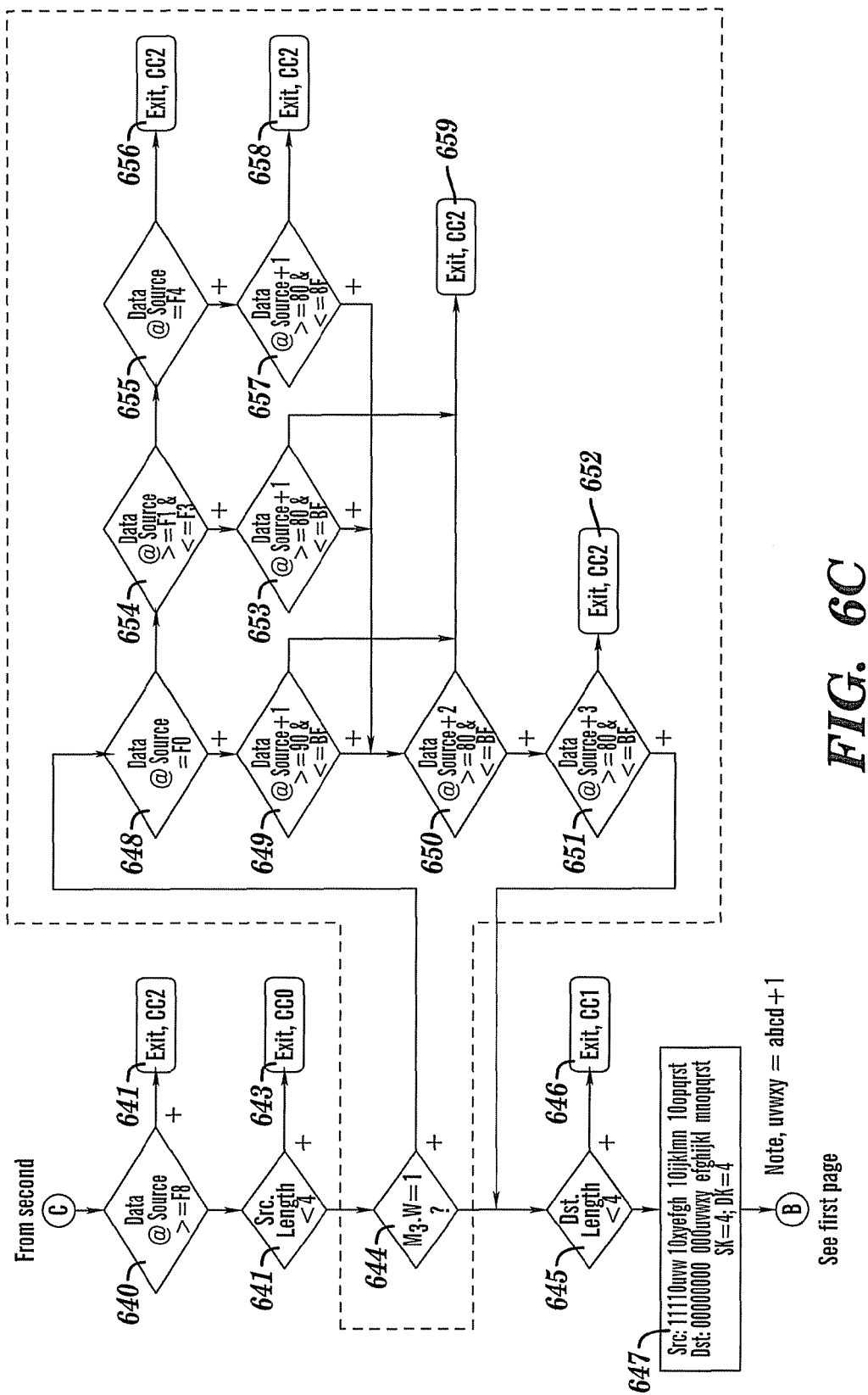

FIGS. 6A, 6B and 6C illustrate the operation of the CU14 instruction (with the ETF3-enhancement facility related steps enclosed by dotted lines), beginning at (600) in FIG. 6A.

1. If the remaining length of the source operand (206) is less than one byte (601), then the source operand is exhausted, and execution ends by setting condition code zero (602).
2. If the value of the next byte of the source operand is between 00 and 7F (603), then processing is as follows:
   a. If the remaining length of the destination operand is less than four bytes (604), then the destination operand is full, and the instruction completes by setting condition code one (605).

b. Bits k-p of the source operand, prefixed by 25 binary zeros, are placed in the four bytes of the destination operand location (622).

3. If the value of the next byte of the source operand is between 80 and BF (606), then the source character is invalid, and the instruction completes by setting condition code two (607).

4. If the ETF3-enhancement facility is installed and the well-formedness-checking control (W), bit 3 of the $M_3$ field, is one (608), then processing is as follows:

a. If the value of the next byte of the source operand is between C0 and C1 (609), then the source character is invalid, and the instruction completes by setting condition code two (610).

b. If the remaining length of the source operand is less than two bytes (613), then the source operand is exhausted, and execution ends by setting condition code zero (614).

c. If the value of the next byte of the source operand is not between C2 and CF (616), then processing continues with step 6 (626).

d. If the second byte of the source character is not between 80 and BF (617), then the character is invalid, and the instruction completes by setting condition code two (618).

e. If the remaining length of the destination operand is less than four bytes (619), then the destination operand is full, and the instruction completes by setting condition code one (620).

f. Bits f-p of the source operand, prefixed by 21 binary zeros are placed in the destination location. (621).

5. If the ETF3-enhancement facility is not installed or the well-formedness-checking control is zero (608), then processing is as follows:

a. If the remaining length of the source operand is less than two bytes (611), then the source operand is exhausted, and execution ends by setting condition code zero (612).

b. If the value of the next byte of the source operand is not between C0 and CF (615), then processing continues with step 6 (626).

c. If the remaining length of the destination operand is less than four bytes (619), then the destination operand is full, and the instruction completes by setting condition code one (620).

d. Bits f-p of the source operand, prefixed by 21 binary zeros are placed in the destination location. (621).

6. Referring to FIG. 6B, if the value of the next byte of the source operand is between E0 and EF (626), then processing is as follows:

a. If the remaining length of the source operand is less than three bytes (627), then the source operand is exhausted, and execution ends by setting condition code zero (628).

b. If the ETF3-enhancement facility is installed, and the well-formedness-checking control (W) is one (629), then processing is as follows:

If the value of the next byte of the source operand is E0 (630), then the second and third bytes of the source operand must be in the range of A0-BF (634) and 80-BF (635), respectively. Otherwise, the character is invalid, and the instruction completes by setting condition code two (639).

If the value of the next byte of the source operand is ED (636), then the second and third bytes of the source operand must be in the range of 80-9F (637) and 80-BF (635), respectively. Otherwise, the character is invalid, and the instruction completes by setting condition code two (639).

Of necessity, the value of the next source byte must be in the range of E1-EC or EE-EF, in which case, the second and third bytes of the source operand must both be in the range of 80-BF (638 & 635). Otherwise, the character is invalid, and the instruction completes by setting condition code two (639).

c. If the remaining length of the destination operand is less than four bytes (631), then the destination operand is full, and the instruction completes by setting condition code one (632).

d. Bits a-p of the source operand, prefixed by 16 binary zeros, are placed in the four bytes of the destination operand (633).

7. Referring to FIG. 6C, if the value of the next byte of the source operand is greater than or equal to F8 (640), then the character is invalid, and the instruction completes by setting condition code two (641).

8. Of necessity, the value of the next byte of the source operand must be in the range of F0-F7, and processing is as follows:

a. If the remaining length of the source operand is less than four bytes (642), then the source operand is exhausted, and execution ends by setting condition code zero (643).

b. If the ETF3-enhancement facility is installed, and the well-formedness-checking control (W) is one (644), then processing is as follows:

If the value of the next byte of the source operand is F0 (648), then the second, third, and fourth bytes of the source operand must be in the range of 90-BF (649), 80-BF (650), and 80-BF (651), respectively. Otherwise, the character is invalid, and the instruction completes by setting condition code two (659 or 652).

If the value of the next byte of the source operand is between F1 and F3 (654), then the second, third, and fourth bytes of the source operand must all be in the range of 80-BF (653, 650, and 651). Otherwise, the character is invalid, and the instruction completes by setting condition code two (659 or 652).

If the value of the next byte of the source operand is F4 (655), then the second, third, and fourth bytes of the source operand must be in the range of 80-8F (657), 80-BF (650) and 80-BF (651), respectively. Otherwise, the character is invalid, and the instruction completes by setting condition code two (658, 659, or 652).

Of necessity, the value of the next source byte must be in the range of F5-F7, in which case the character is invalid, and the instruction completes by setting condition code two (656).

9. Referring again to FIG. 6A, the source address is incremented by the number of source bytes processed (1, 2, 3, or 4, as indicated by "SK"), and the remaining source length is decremented by the same amount. The destination address is incremented by four (the number of destination bytes processed, as indicated by "DK"), and the remaining destination length is decremented by the same amount. (623)

10. If a model-dependent number of bytes have been processed (624), then the instruction completes by setting condition code three (625). Otherwise, processing resumes at the beginning of this description.

Unpredictable results can occur in the following situations:

When the register designating the first operand ($R_1$) is the same register as that designating the second operand ($R_2$) (that is, the destination and source fields overlap).

When the second operand overlaps the first operand.

Access exceptions for the portions of the operands to the right of the last byte processed may or may not be recognized. For an operand longer than 4K bytes, access exceptions are not recognized for locations more than 4K bytes beyond the last byte processed. When the length of an operand is zero, no access exceptions are recognized for that operand. Access exceptions are not recognized for an operand if the R field associated with that operand is odd.

Resulting Condition Code:

| 0 | Entire second operand processed |
|---|---|
| 1 | End of first operand reached |
| 2 | Invalid UTF-8 character |
| 3 | CPU-determined number of characters processed |

When condition code 3 is set, the program can simply branch back to the instruction to continue the conversion. The program need not determine the number of first-operand or second-operand bytes that were processed.

When the ETF3-enhancement facility is not installed, or when the W bit of the $M_3$ operand is zero, bits 0 and 1 of the continuation bytes of multiple-byte UTF-8 characters are not checked in order to improve the performance of the conversion. Therefore, invalid continuation bytes are not detected.

The flow charts/diagrams depicted herein are just examples. There may be many variations to these charts/diagrams or the steps (or operations) described therein without departing from the spirit of the invention. For instance, the steps may be performed in a differing order, or steps may be added, deleted or modified. All of these variations are considered a part of the claimed invention.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. An instruction set stored on a computer-readable medium, the instruction set comprising instructions designed to convert the UTF argument characters of a second operand within a data processing system comprising:
   an operation code field, said operation field identifies said instruction;
   a control field, said control field controls operation of said instruction; and
   one or more general registers; and
   a storage means;
   wherein a first general register contains the address of a first operand in said storage means, and a second general register contains the address of a second operand in said storage means;
   wherein said control field comprises a well-formedness-checking control that determines whether well-formedness checking and processing is performed by said instruction;
   wherein when said well-formedness-checking control is one, well-formedness checking and processing is performed by said instruction;
   wherein said well-formedness checking and processing includes one of:
      declaring an instruction invalid if a first N bits of a first two-byte field of a Unicode surrogate pair does not equal a predetermined binary value; and
      declaring an instruction invalid if a value of a next byte of a source operand is between a predetermined range.

2. The instruction according to claim 1, wherein when said well-formedness-checking control is zero, well-formedness checking and processing is not performed by said instruction.

3. The instruction according to claim 1, wherein said first operand specifies a destination.

4. The instruction according to claim 1, wherein said second operand specifies the source.

5. The instruction set according to claim 1, wherein said data processing system further comprises a high-level assembler;
   wherein said control field is defined to be an optional operand for said instruction as defined to said high-level assembler; and
   wherein the default value for said control field is zero if it is not specified.

6. The instruction set of claim 1, wherein said data processing system operates with a 24-bit addressing mode.

7. The instruction set of claim 1, wherein said data processing system operates with a 31-bit addressing mode.

8. The instruction set of claim 1, wherein said data processing system operates with a 64-bit addressing mode.

9. The instruction set of claim 1, wherein a condition code is determined based on the values in said registers and in said storage means.

10. The instruction set of claim 1, wherein a condition code is determined based on the state of said instruction set.

11. A computer-implemented method to convert the UTF argument characters of a second operand within a data processing system, wherein said conversion proceeds until a predetermined number of characters have been processed or until predetermined conditions have been met; and wherein said method further comprises:
   providing an instruction set comprising instructions;
   providing an operation code field, said operation field identifies said instruction;

providing a control field, said control field controls operation of said instruction;

providing one or more general registers; and providing a storage means;

wherein a first general register contains the address of a first operand in said storage means, a second general register contains the address of a second operand in said storage means;

wherein said control field comprises a well-formedness-checking control that determines whether well-formedness checking and processing is performed by said instruction;

wherein when said well-formedness-checking control is one, well-formedness checking and processing is performed by said instruction;

wherein said well-formedness checking and processing includes one of:
  declaring an instruction invalid if a first N bits of a first two-byte field of a Unicode surrogate pair does not equal a predetermined binary value; and
  declaring an instruction invalid if a value of a next byte of a source operand is between a predetermined range.

12. The method according to claim 11, wherein when said well-formedness-checking control is zero, well-formedness checking and processing is not performed by said instruction.

13. The method according to claim 11, wherein said first operand specifies a destination.

14. The method according to claim 11, wherein said second operand specifies the source.

15. The method according to claim 11, wherein said method further comprises:

providing a set of condition codes; and wherein when the entire said second operand has been processed said condition code is set to condition code zero and said instruction is exited; and wherein when the end said first operand is reached said condition code is set to condition code one and said instruction is exited; and wherein when an invalid character is encountered said condition code is set to condition code two and said instruction is exited; and wherein when said predetermined number of characters have been processed said condition code is set to condition code three and said instruction is exited.

16. A storage medium encoded with machine-readable computer code for an assembler to implement an instruction set of instructions designed to convert the UTF argument characters of a second operand within a data processing system, wherein said conversion proceeds until a predetermined number of characters have been processed or until predetermined conditions have been met; and wherein a well-formedness-checking control is added to a control field of said instructions, and said well-formedness-checking control determines whether well-formedness checking and processing is performed by said instruction; and wherein when said well-formedness-checking control is zero, well-formedness checking and processing is not performed by said instruction; and wherein when said well-formedness-checking control is one, well-formedness checking and processing is performed by said instruction; and wherein said control field with said well-formedness-checking control is defined as an optional operand to said assembler, and wherein the default value for said optional operand if it is not specified is zero;

wherein said well-formedness checking and processing includes one of:
  declaring an instruction invalid if a first N bits of a first two-byte field of a Unicode surrogate pair does not equal a predetermined binary value; and
  declaring an instruction invalid if a value of a next byte of a source operand is between a predetermined range.

* * * * *